United States Patent [19]
Banks et al.

[11] Patent Number: 6,158,666
[45] Date of Patent: Dec. 12, 2000

[54] VACUUM FASTENED GUIDE AND METHOD FOR SUPPORTING TOOLING ON A COMPONENT

[76] Inventors: David P. Banks; James N. Buttrick, Jr.; Charles H. Glaisyer; Darrell D. Jones; Russell C. McCrum; Philip M. Wright, all of The Boeing Company P.O. Box 3707, M/S 13-08, Seattle, Wash. 98124-2207

[21] Appl. No.: 09/198,810

[22] Filed: Nov. 24, 1998

Related U.S. Application Data

[60] Provisional application No. 60/066,614, Nov. 26, 1997.

[51] Int. Cl.$^7$ ...................................................... E01B 23/00
[52] U.S. Cl. ...................... 238/10 R; 238/310; 238/338; 105/29.1; 105/25
[58] Field of Search .............................. 29/428; 105/29.1; 238/10 R, 10 A, 10 B, 10 F, 310, 338

[56] References Cited

U.S. PATENT DOCUMENTS

| | | | |
|---|---|---|---|
| 4,662,556 | 5/1987 | Gidlund | 227/69 |
| 5,323,962 | 6/1994 | Jassby et al. | 238/10 R |
| 5,562,043 | 10/1996 | Gromes | 105/29.1 |

*Primary Examiner*—Mark T. Le
*Attorney, Agent, or Firm*—Lawrence W. Nelson

[57] ABSTRACT

The present invention relates to vacuum fastened guide that supports and facilitates movements of a machining device along at least one component to be operated upon. The guide includes a primary rail that is vacuum coupled to the component. The primary rail includes a primary tube portion for slideable engagement with the machining device, and a primary contact platform coupled to the primary tube portion for forming a vacuum between the primary rail and the component.

4 Claims, 25 Drawing Sheets

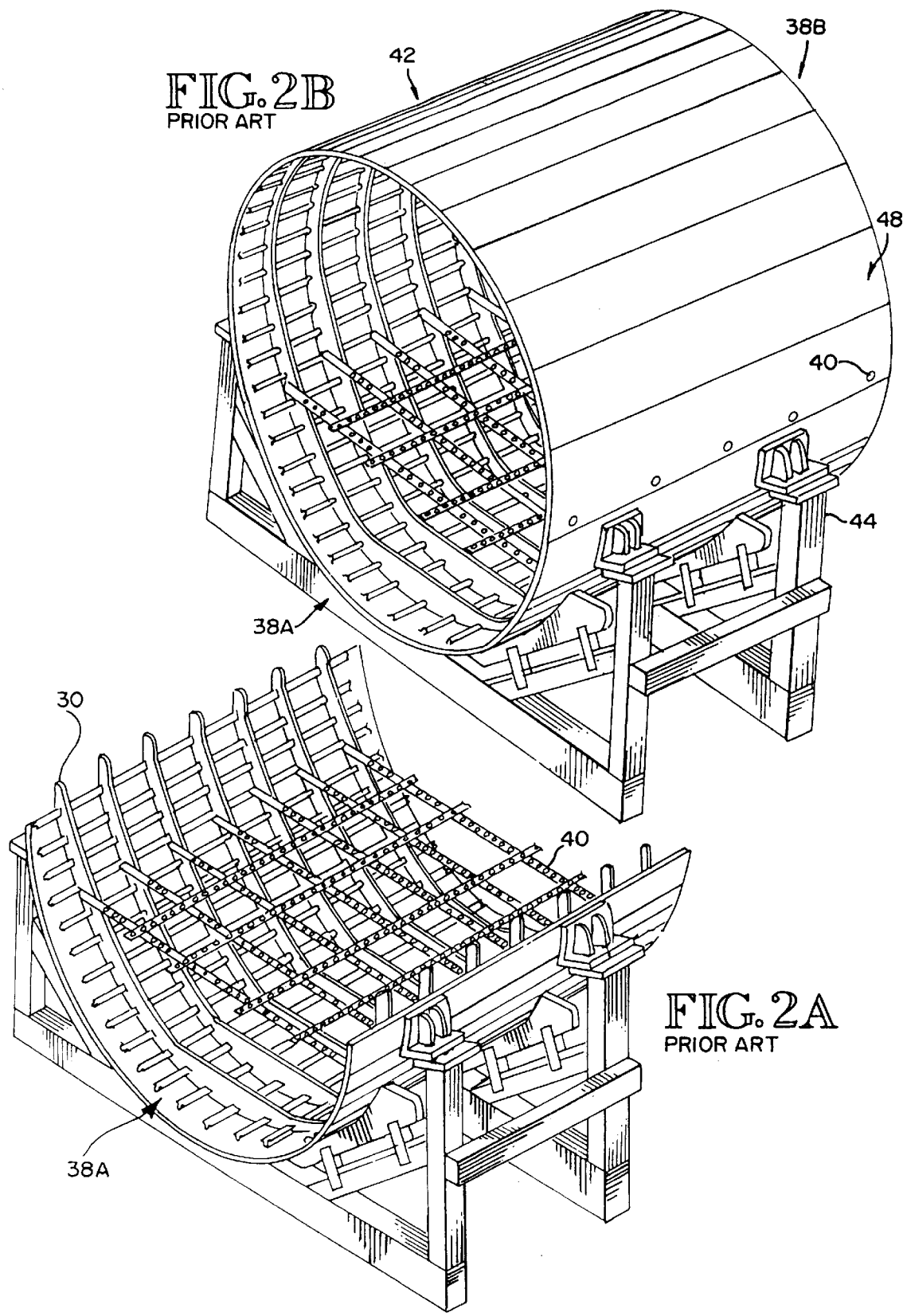

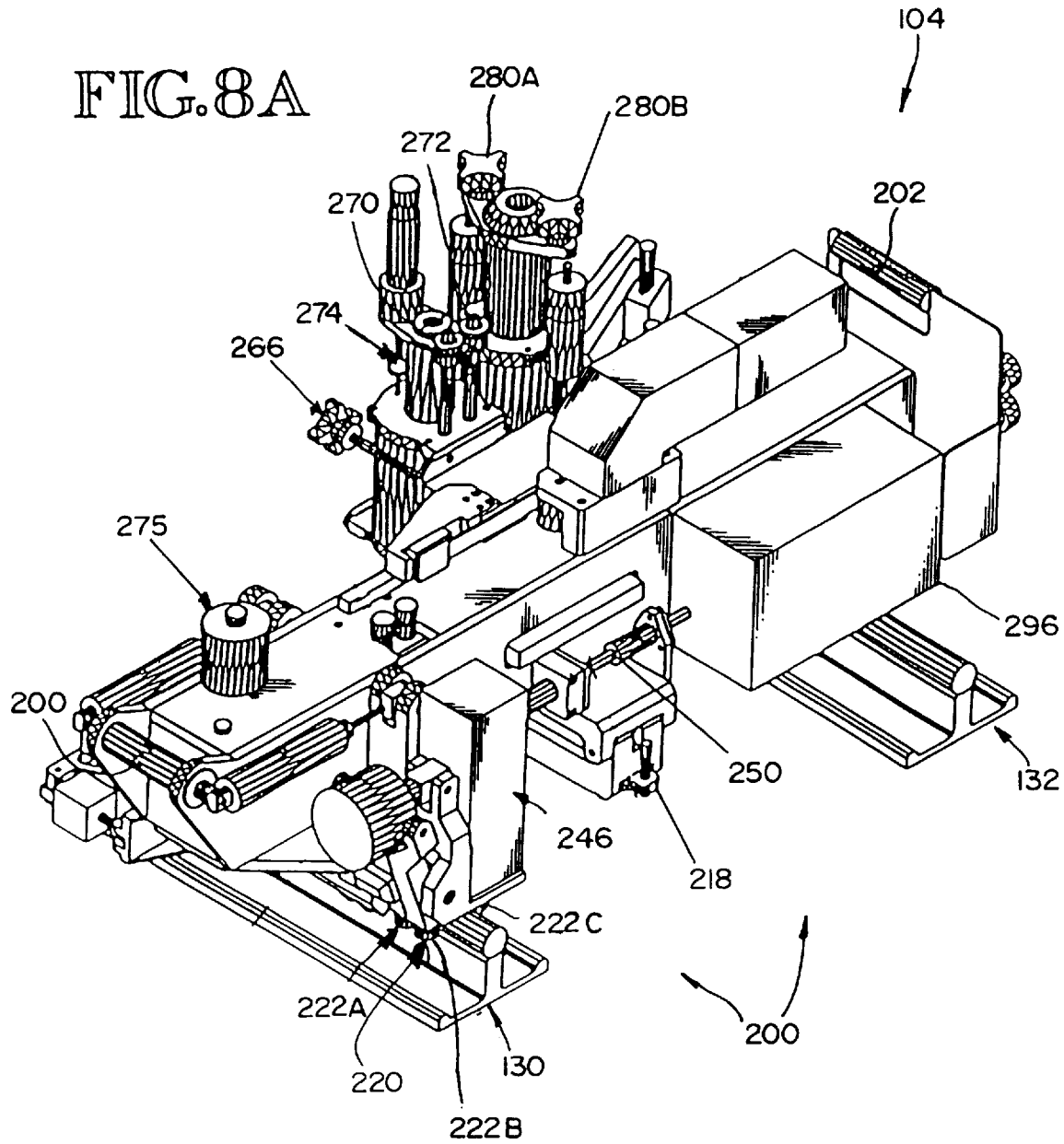

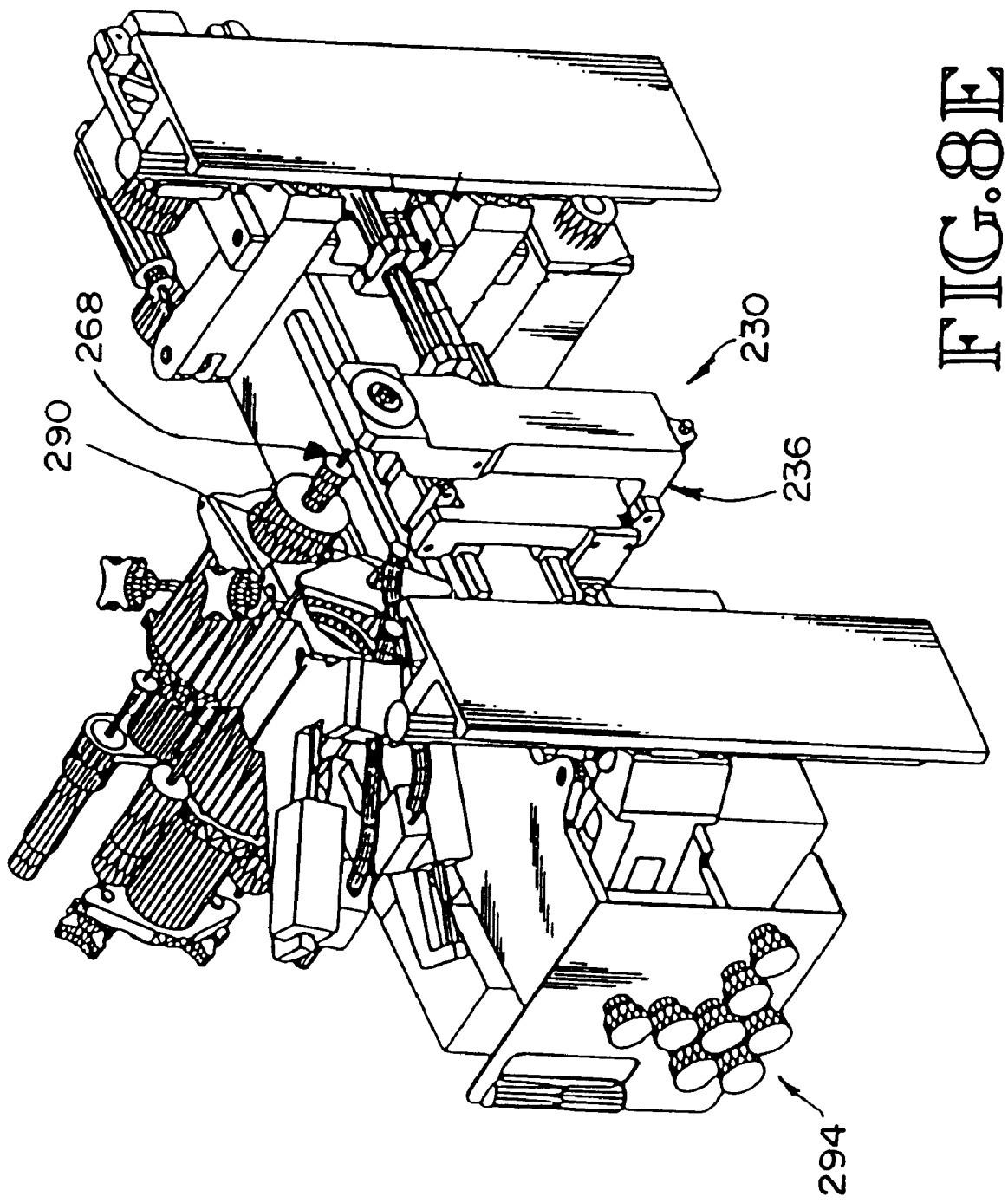

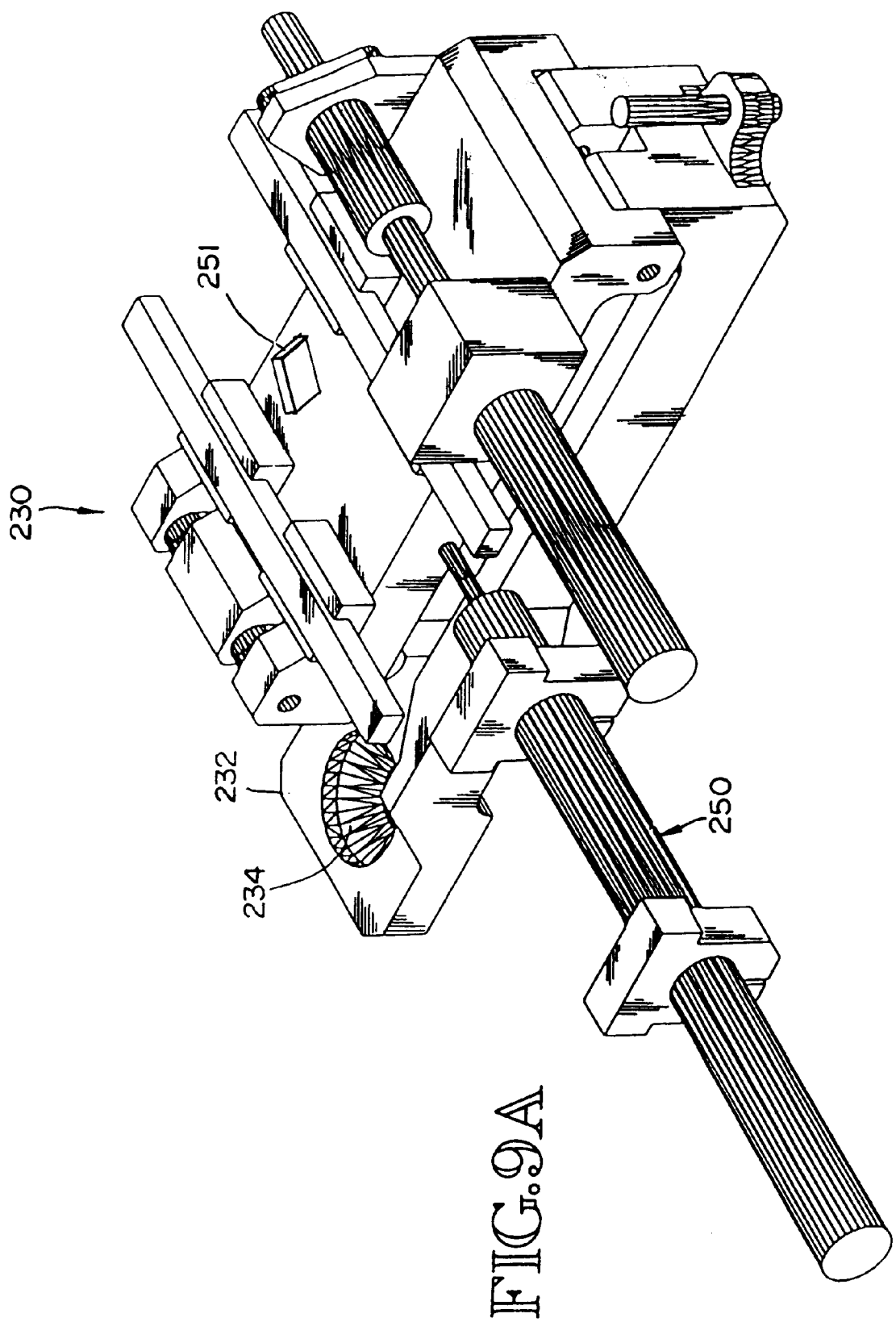

FIG. 14A
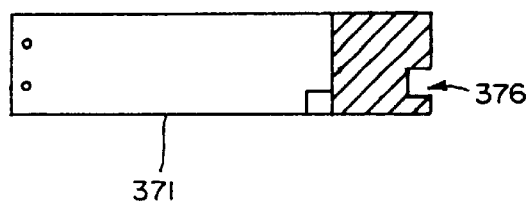
FIG. 14B
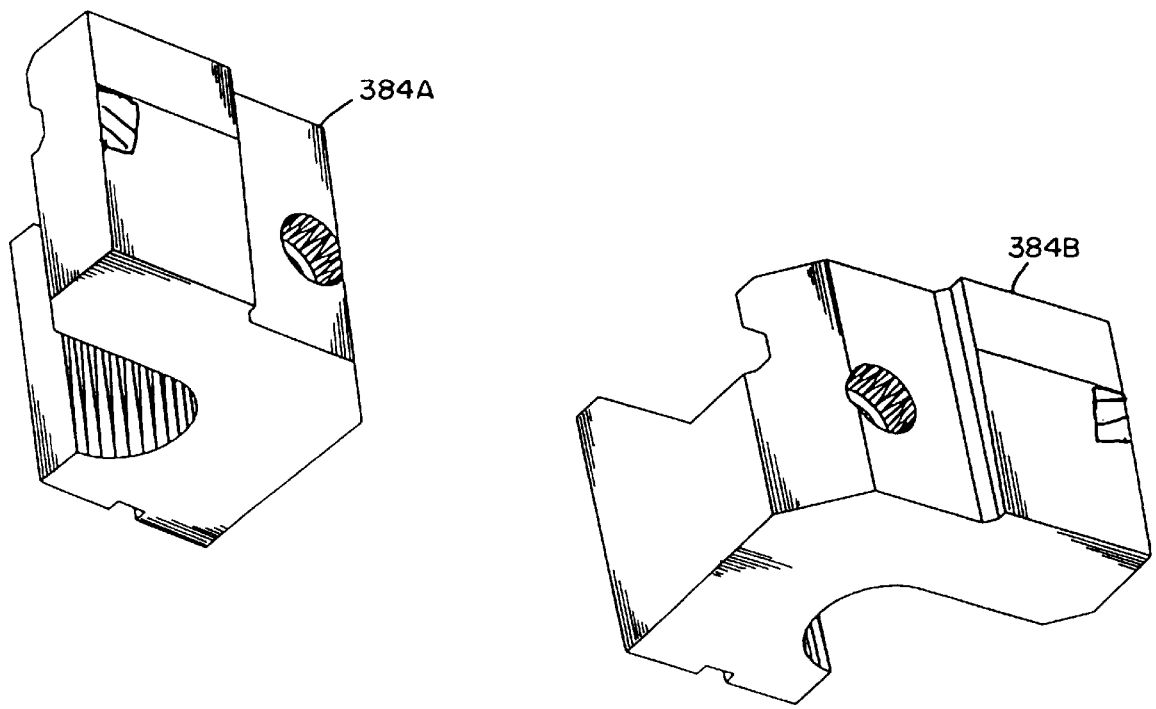
FIG. 14C

VACUUM FASTENED GUIDE AND METHOD FOR SUPPORTING TOOLING ON A COMPONENT

This application claim benefit to provisional application 60/066,614 filing Nov. 26, 1997.

BACKGROUND OF THE INVENTION

1. Field of the Invention

The present invention relates to a guide for supporting tooling, and more particularly, to a guide rail system supporting an end-effector.

2. Background of the Invention

Traditional manufacturing techniques for assembling components to produce large mechanical structures to a specified contour have relied on fixtured tooling techniques utilizing assembly jigs and templates to locate the parts correctly relative to one another. Unfortunately, this method often yielded parts outside of acceptable tolerance because of imperfections in the templates or changes in the fixtured tooling caused by temperature variations.

To solve the problems encountered by traditional techniques, a system and method for assembling components was developed that utilized spatial relationships between key features of subassemblies as represented by coordination holes drilled into the subassemblies using numerical part definition records. The subassemblies were made intrinsically determinate of the dimensions and contour of the assembly.

The use of key features to determine the dimensions and contour of an airplane fuselage section is shown in FIG. 1. Here, a skin 20 has a plurality of stringers 22 and a plurality of shear ties 24 riveted thereon. A frame member 30 having a curved contour which is the same as the desired contour of the airplane fuselage is then riveted to the shear ties 24 and stringer clips 26.

The stringers 22, the shear ties 24 and the stringer clips 26 must be fastened to the fuselage skin 20 with extreme accuracy and consistency. Accuracy of parts manufacture ensures that the airplane will come together perfectly with no pre-stressed parts and no cosmetic imperfections.

Initially, a computer numerically controlled (CNC) machine tool performs machining operations on the skin 20. Coordination holes are drilled in the skin 20 and the stringers 22. Corresponding coordination holes are also drilled in the shear ties 24 and the stringer clips 26. A final machining operation of edge routing is performed by a high speed routing end-effector to route the edges of the fuselage skin 20 to the correct dimensions, as specified by the original part definition data base, by accurately locating the edges of the skin relative to the coordination holes in the skin.

The stringers 22 are tack fastened to the skin 20 through their aligned coordination holes. Then the shear ties 24 and stringers 22 are drilled and riveted to the skin 20. The stringer clips 26 are inserted at the correct location and are held in place while drilled and riveted to form a panel 34.

The skin 20 also has a series of panel-to-panel coordination holes 32 drilled along the edge of the skin 20. The panel-to-panel coordination holes 32 are used to position the panels 34 relative to each other. The panels 34 are still relatively flexible so the ultimate configuration is determined by the parts and their matched coordination holes.

The panel-to-panel coordination holes 32 are aligned on adjacent holes and sealant is applied between the facing surfaces of the panel edges. The panels 34 are aligned so that the panel-to-panel coordination holes 32 on adjacent panels 34 line up exactly and the two panels are fastened together at their adjacent edges by temporary cleco fasteners through the coordination holes. The panels are then drilled and riveted to permanently fasten them together to form a super panel 36.

Coordination holes are drilled into the frames 30 and are aligned with the coordination holes in the stringer clips 26. The frames 30 are fastened and their alignment determines the contour of the super panel 36. Thus, the contour is independent of any hard tooling. Once the super panel 36 is formed, the temporary cleco fasteners holding the parts in position are replaced by permanent fasteners.

The super panels 36 are temporarily fastened using the panel-to-panel coordination holes 32 to form fuselage quarter panels which are in turn temporarily fastened to form a lower fuselage lobe 38A and an upper fuselage lobe 38B, as shown in FIGS. 2A and 2B. A floor grid 40 is aligned with the lower lobe 38A using coordination holes, and is fastened in place. The fixture 44 does not determine the contour or dimensions of the fuselage. Instead, the coordination holes drilled into the floor grid 40 determines the cross-dimensions of the fuselage 42.

Once the frame members 30 and lobe skin coordination holes 46 are all aligned and temporarily fastened with cleco fasteners, they are drilled to form the final fuselage section 42, as shown in FIG. 2B. The fuselage section 42 is then disassembled, de-burred, cleaned, and sealant is added.

After sealing, each super panel 36 is again aligned using the coordination holes. The overlapping portion of the panels 36, a lap joint 48, is shown in FIGS. 2B and 2C. Each lap joint 48 has a plurality of columns 50, where each of the columns 50 has 3 rows of rivets 52A–C. Two rivets of the rows 52A and 52C are for rivets that require a countersink as well as drilling.

The super panels 36 could be fastened to form a quarter panel by an assembly device, such as that described in U.S. Pat. No. 4,662,556 (the '556 patent). However, the device described in the '556 patent moves a working unit along a guide beam that is supported by two huge arc-shaped girders, and could not be used to form the lower or upper fuselage lobes 38A and 38B, respectively, because of its size and design. Simply put, the unit described in the '556 patent or any variations thereof would not fit within the fuselage lobes 35A and 38B, and certainly not the fuselage assembly 42. Attempts to redesign the assembly device discussed in the '556 patent to handle larger portions of the fuselage assembly 42 have failed because of severe problems with vibration which interfered with the proper seating of fasteners such as rivets. Further, the assembly device discussed in the '556 patent is not versatile and requires an expensive and heavy support structure.

Presently, the fuselage quarter panels 36 and, lower and upper lobes 38A and 38B, and the final fuselage assembly 42 are re-tacked into position after being filed, cleaned, and sealed. Then, the panels 36 are riveted together by hand, where one person stands on a platform (not shown) outside the fuselage, inserting and then pneumatically driving a rivet fastener while another person stands inside the fuselage, bracing a large bucking bar against a rivet shank and holding it in place by leaning against the bucking bar with his shoulder. Obviously, such a process presents a risk of injury. Further, the manual process results in rivets that were unevenly deformed, poorly seated, or riveted too close to an edge of the lap joint 48.

Unfortunately, the manual process is dangerous, time-consuming, expensive and often leads to extensive rework.

Consequently, there is a need in the art for a fastening system that speeds up production, ensures riveting and drilling accuracy, eliminates the required step of disassembling the entire fuselage to de-burr, clean and seal, and can be operated within the final fuselage assembly 42.

SUMMARY OF THE INVENTION

According to one aspect of the invention, a vacuum fastened guide supports and facilitates movements of a machining device along at least one component to be operated upon. The guide includes a primary rail that is vacuum coupled to the component. The primary rail includes a primary tube portion for slideable engagement with the machining device, and a primary contact platform coupled to the primary tube portion for forming a vacuum between the primary rail and the component.

According to another aspect of the invention, a vacuum guide rail system is coupled to a first aircraft fuselage skin panel and a second aircraft fuselage skin panel for guiding a tool along a lap joint of the first and second aircraft fuselage skin panels. The rail system includes a primary guide rail for slideable engagement and support of the tool along the lap joint. The primary guide rail includes a plurality of regions in which a vacuum between the first aircraft fuselage skin panel and the primary guide rail is formed. The rail system also includes a secondary guide rail for slideable engagement and support of the tool along the lap joint. The secondary guide rail includes a plurality of regions in which a vacuum between the second aircraft fuselage skin panel and the secondary guide rail is formed.

According to yet another aspect of the invention, a method supports and aligns a tool to a component on which it is to operate. The method includes the steps of aligning a plurality of rail ties to a region of the component, coupling a primary end of each of the rail ties to a primary guide rail, and coupling a secondary end of each of the rail ties to a secondary guide rail. The method also includes the steps of generating a vacuum between the primary guide rail and the component, generating a vacuum between the secondary guide rail and the component, and engaging the tool to the primary guide rail and the secondary guide rail such that it is slidingly coupled along a length of the primary and secondary guide rails.

BRIEF DESCRIPTION OF THE DRAWINGS

The features, aspects, and advantages of the present invention will become better understood with regard to the following accompanying drawings where:

FIG. 2A is a perspective view of a prior art fuselage lower lobe showing a floor grid;

FIG. 2B is a perspective view of a prior art completely assembled fuselage section;

FIG. 8A is a perspective view from the upper left of the outside end-effector;

FIG. 8E is a perspective view of the bottom of the outside end-effector;

FIG. 9A is a perspective view of a pressure foot subassembly of the outside end-effector;

FIG. 13A shows a bucking bar at initial clamp-up;

FIG. 13B shows a bucking bar just prior to deformation;

FIG. 13C shows a bucking bar seated against a button upon completion of a fastening cycle;

FIG. 14A is a perspective view of a straight bucking bar;

FIG. 14B is a perspective view of a left-handed bucking bar;

FIG. 14C is a perspective view of a right-hand bucking bar;

DETAILED DESCRIPTION OF THE PREFERRED EMBODIMENTS

Figure 1:
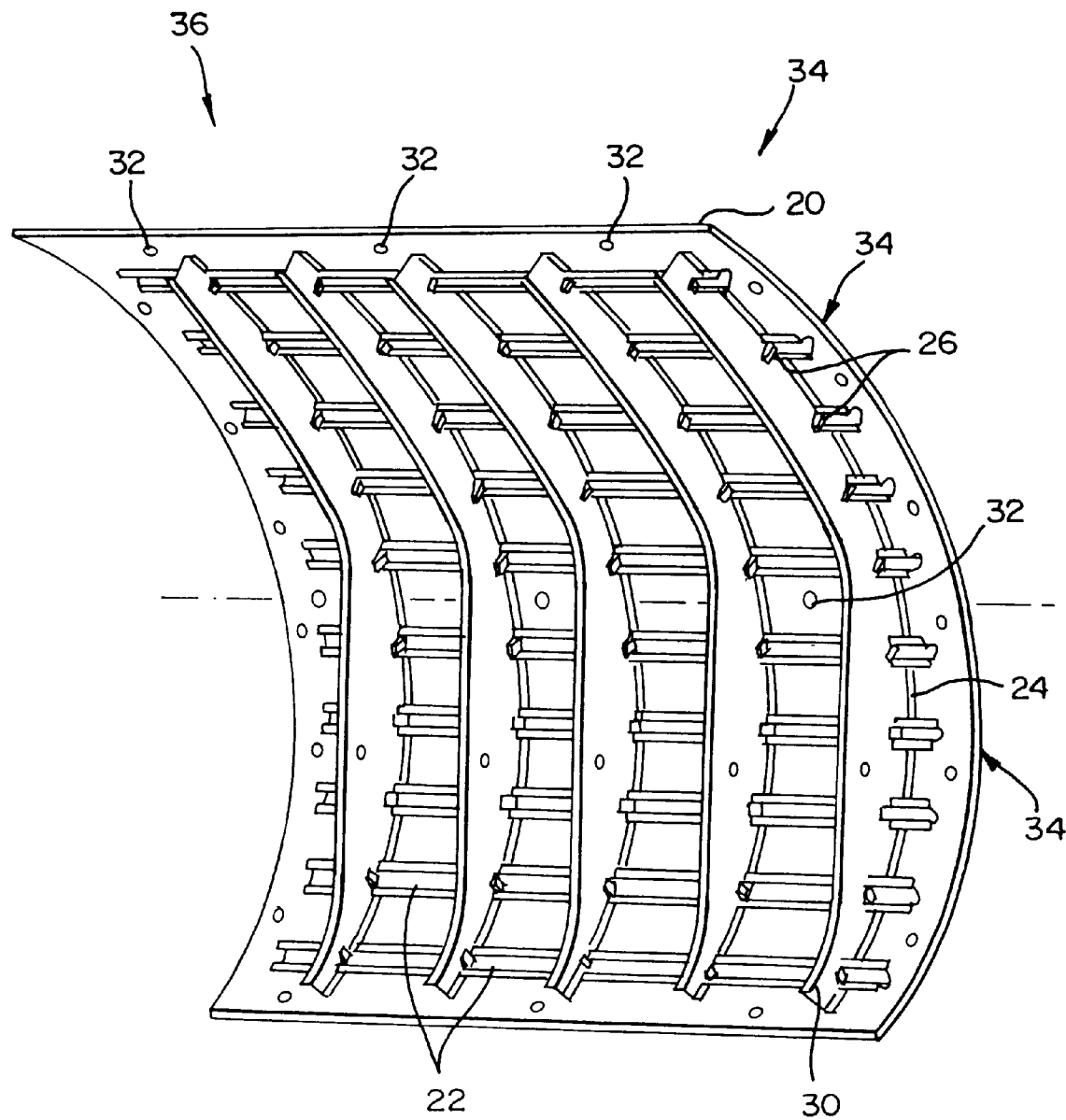
FIG. 1 is a perspective view of an assembled prior art super panel, showing skin, stringers, shear ties, stringer clips, and frame members.
Figure 2C:
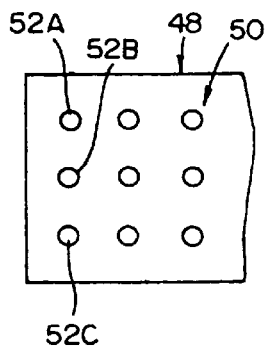
FIG. 2C is a plan view of a prior art skin lap joint between two super panels.

Definitions:

Airframe: the structural assembly that comprises the body of an airplane without wings or horizontal and vertical stabilizers;

Boelube: Cetyl alcohol, a nontoxic lubricant used for metal cutting;

Bucking Bar: A metal tool used to flatten the rivet's shank into a driven button during the riveting process. The bucking bar is used as an anvil to react the forces being driven into the rivet with a rivet gun, thus deforming the rivet;

Clamp-Up: Hold two or more pieces of the airframe together so that there are no gaps between the principal surfaces; the ability to hold the work pieces together;

Countersink Depth: Depth of countersink in a fastener hole;

Countersinking: Machining of a conical hole coaxial with a through-hole for purposes of accepting a fastener head that will be flush (i.e.; the same height as) with the material surrounding the hole;

Dwell Time: A period of time that is permitted to elapse as part of normal fastening operations: e.g.; for sealant squeeze out, for maintaining power to the rivet gun during rivet driving, etc;

End-Effector: A tool positioner with modules installed;

E-Stop (Emergency Stop): A software-independent stop signal that causes the system to stop immediately upon activation;

Fail-Safe: Incorporating some feature for automatically counteracting the effect of an anticipated possible source of failure; having no chance of failure; infallible, problem-free;

Fasteners: The generic term used to describe rivets and bolts;

Feed-hold: A software-controlled stop of the system at any point in the process; (Power to motors and drives should not need to be removed.)

Lap Joint: An area of overlap between two panels to be fastened, where columns of rivets are installed along a length of the lap joint and rows of rivets are installed along the width of the lap joint.

Machine Control Data (MCD): The program that is loaded into the controller that directs the operation of the MRS in performing the lap fastening process;

Modal: Numerical Control (N/C) operating modes that are maintained (latched) in an acting state for all subsequent operations until modified by another N/C command;

Module: An independently operable unit that is part of the total system. Examples are the drill/countersink module, the rivet drive and feed module;

Rc (Rockwell "C"): A standard method of measuring and designating the hardness of metals;

Rivet: A metal bolt or pin used to join two or more objects by inserting it through a hole in each object and then hammering the narrow end to form another head (or button);

Sealant: A durable, waterproof material applied to selected assemblies to prevent water from infiltrating and aiding in the corrosion of those assemblies;

Software Source Code: The editable software scripts that a software developer writes for a computer application;

Stay-Within Envelope: An imaginary envelope that the system, when mounted on guide rails installed on an airframe, must not extend beyond.

Swirl Marks: Marks into the surface of a material that is being drilled that are concentric with the hole. The cutaway material that is being expelled from the hole causes swirl marks; and Workpiece, Component, Panel: Airframe or any structure or item that the system will perform elements of the fastening process on.

Mini-Riveter System

The present invention relates to a mini-riveter system capable of quickly and accurately fastening two panels at a lap joint without the use of large cumbersome machinery.

Figure 3:
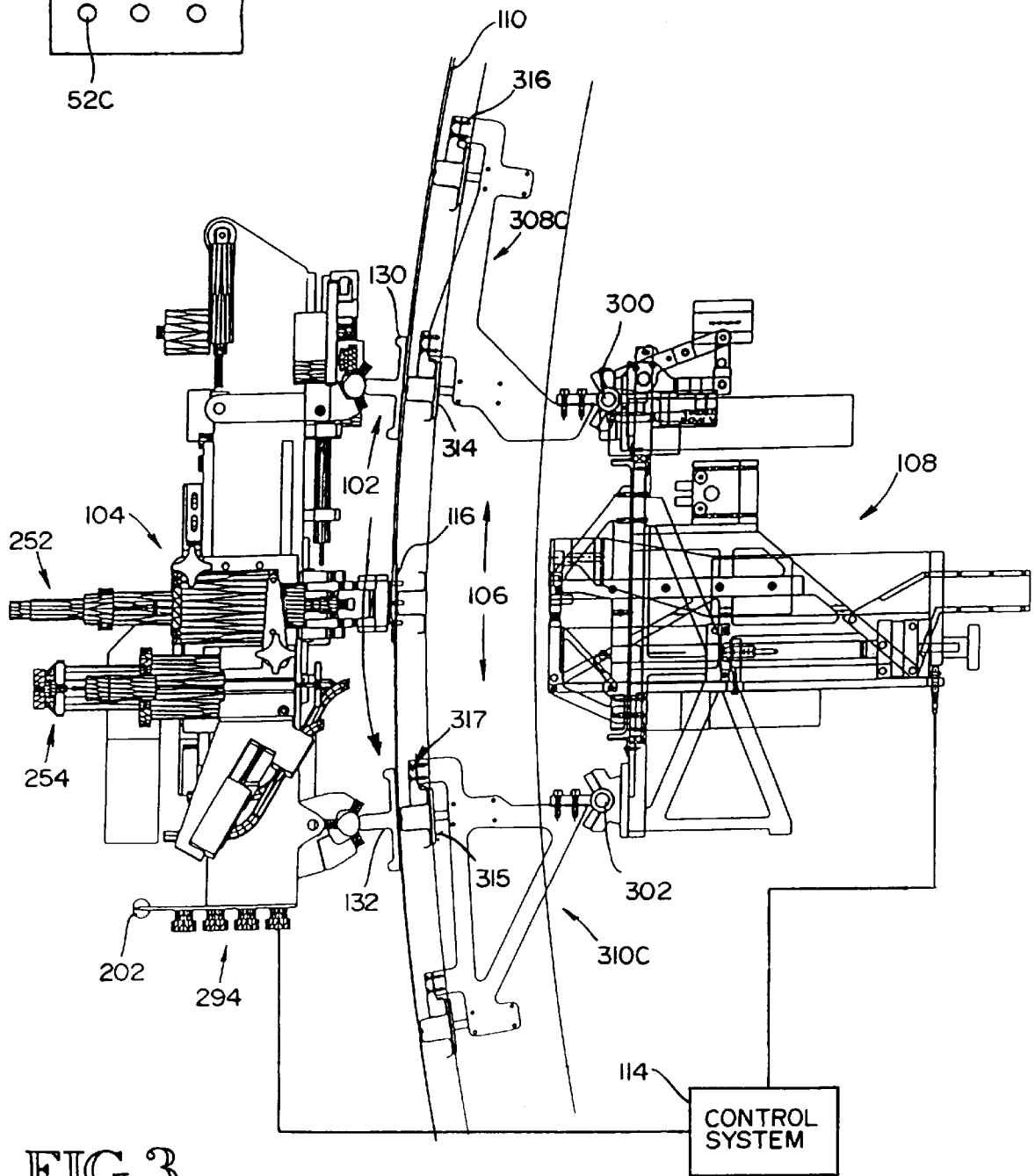
FIG. 3 is an end view of a mini-riveter system of the present invention.

As shown in FIG. 3, the mini-riveter system 100 includes external guide rails 102, supported by and positioned on an outside surface of the overlapped panels 110, and an outside end-effector subsystem 104 movable along the external guide rails 102, for clamping the panels 110, drilling/countersinking the panels 110, fastener feeding/insertion into the panels 110, and driving a rivet to fasten the panels 110. The mini-riveter system 100 also includes internal guide rails 106, supported by and positioned on an inside surface of the panels 110, and an inside end-effector subsystem 108, movable along the internal guide rails 106, for clamping the panels 110 and bucking a rivet to fasten the panels 110, even when the fastener is obstructed by a feature attached to one of the panels 110.

Figure 15:
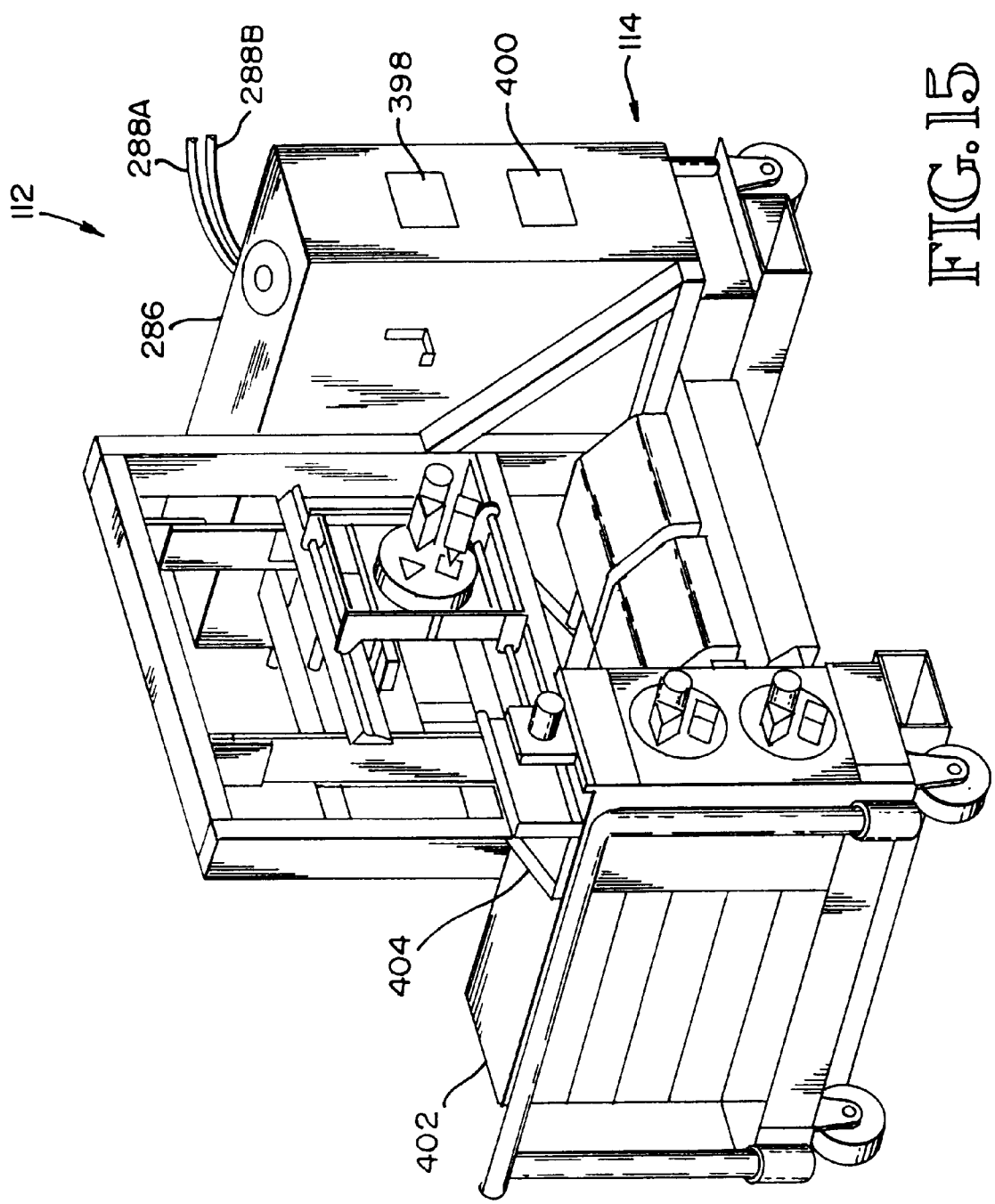
FIG. 15 is a perspective view of a system cart including a control system of the mini-riveter system.

The mini-riveter system 100 is easily transportable on a control system cart 112, as shown in FIG. 15, which supports a control system 114. The system 100 is capable of being quickly installed onto the two panels 110 without special tooling support requirements. Further, the system 100 is compact enough that it can be easily installed and moved around the inside and outside of an airframe fuselage section. Finally, the system 100 is flexible enough to fasten individual panels, combinations of panels, subsets of an airframe fuselage, or an entire airframe fuselage.

The outside end-effector 104 and the inside end-effector 108, as shown in FIG. 3, clamp down a portion of a lap joint 116 formed by the two panels 110 in a localized manner without interfering with other nearby operations. Further, the localized pressure extended during the clamp down prevents burring and keeps chips from falling between the lap joint 116. Thus, the localized pressure allows the steps of sealing and drilling the lap joint 116 to be immediately followed by the step of fastening the lap joint 116. This quick process replaces the former process of untacking drill components, filing them, cleaning them, sealing them and re-tacking and aligning them and then fastening the panels 110 together at the lap joint 116.

The system 100 also offers a high degree of modularity, allowing quick and easy replacement of drills, countersinks, rivet guns, and bucking bars. This arrangement provides a high degree of flexibility and enables the system 100 to accommodate a large percentage of fastening tasks required on an air frame.

The small size and light weight of the mini-riveter system 100 makes it ideal for gang fastening, where multiple versions of the system 100 are installed at various positions along a larger mechanical structure, such as an airframe to conduct simultaneous operations on the same lap joint, or to conduct simultaneous operations on different lap joints of the structure/airframe fuselage. This capability of the system 100 significantly improves the production flow rate of an aircraft fuselage.

Unlike prior art fastening devices which home or zero their coordinate systems on a fixture, the mini-riveter system 100 is able to home on the coordination holes being used to align the two panels 110. The use of the coordination holes to home the inside end-effector 104 and the outside end-effector 108 increases both the end-effectors' accuracy, and by re-homing the inside and outside end-effectors 104 and 108, respectively, at each of the coordination holes along a lap joint 116, drift due to thermal change or fastener-induced growth is minimized.

Direct Index Pins

Figure 4A:
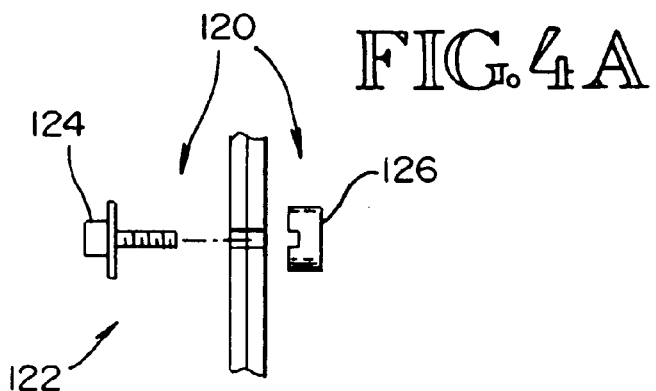
FIG. 4A is a side view of an index pin of the mini-riveter system.
Figure 4B:
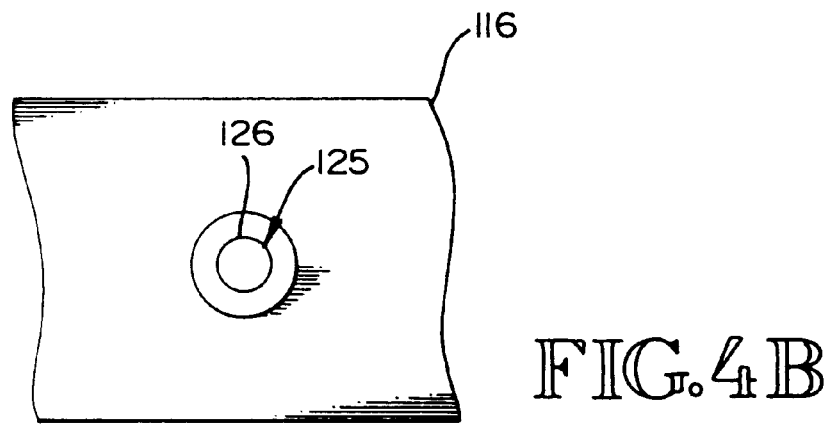
FIG. 4B is a front view of the index pin.
Figure 4C:
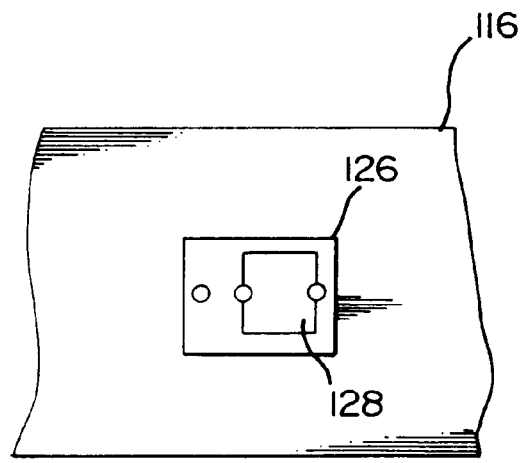
FIG. 4C is a front view of a reflective head of the index pin.

The mini-riveter system 100 homes or zeros in on the same coordination holes used to align the overlapping panels 110 at the lap joint 116. To accomplish this, direct index pins 120, as shown in FIGS. 4A–4C, are installed in the coordination holes at the lap joint 116. The direct index pins 120 include a protruding key 122, having a threaded shank that snugly fits within the coordination holes, as well as a portion that extends from the outside surface of the lap joint 116, having an outer lip 124 used to align the external guide rails, and recess 125 used to home the outside end-effector 104. The direct index pins 120 also include a reflective head 126 that threadingly engages the shank of the protruding key 122. The reflective head 126, which extends out from the inside surface of the lap joint 116, includes a reflecting square 128, used to home the inside end-effector 108. The reflecting square has a width w in parallel with the length of the lap joint 116.

The mini-riveter system 100 establishes a positioning reference coordinate system relative to the index pins 120 installed in the lap joint 116. The use of the index pins 120 allows the establishment of local coordinate points to re-zero both the outside end-effector 104 and the inside end-effector 108. By periodically re-zeroing the end-effectors, the likelihood of improper positioning of holes and fasteners due to growth or distortion along the lap joint 116 is dramatically reduced. Also, by homing on the coordination holes, there is no need for a fixture to home the end-effectors. The use of a fixture which would reduce the overall advantages gained by aligning components with coordination holes.

External Guide Rails

Figure 5:
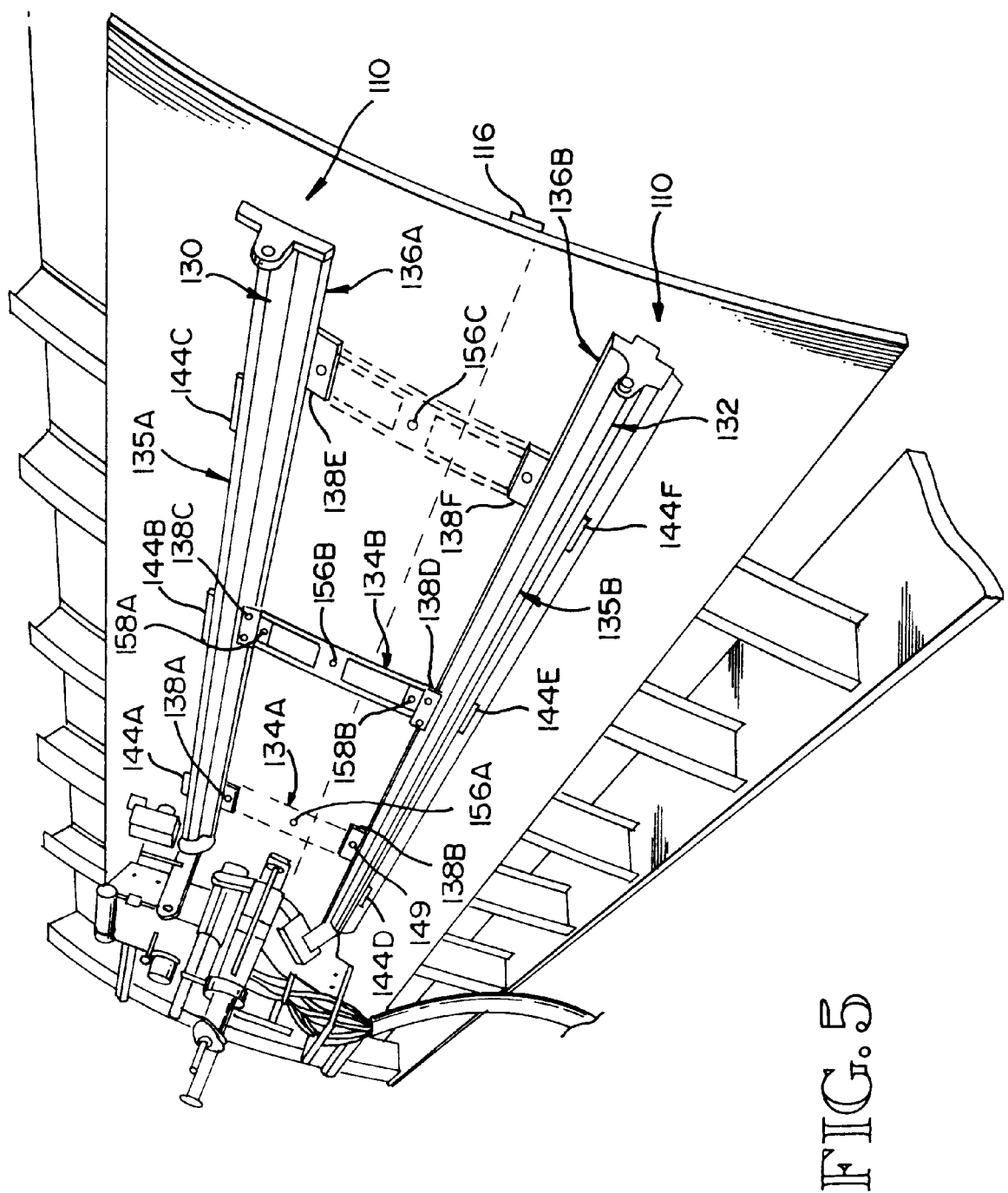
FIG. 5 is a perspective view of external guide rails and an outside end-effector subsystem of the mini-riveter system.

The external guide rails 102, as shown in FIG. 5, include a primary rail 130, a secondary rail 132, and a plurality of rail ties 134A–134C. The rail ties 134A–134C are each aligned to the key 122 of one of the index pins 120. Then, the rail ties 134 are coupled to the primary and secondary rails 130 and 132, and are used to align the primary and secondary rails 130 and 132 to the lap joint 116.

The primary rail 130 and the secondary rail 132 each have a tube portion 135A and 135B, respectively, for slideable engagement with the outside end-effector 104, as well as respective primary and secondary contact platforms 136A and 136B, for contact with the lap joint 116. The tube portions 135A and 135B are mechanically coupled to their respective contact platforms 136A and 136B.

The contact platforms 136A and 136B each have a plurality of lips 138A–138F, respectively, each extending toward the lap joint 116. Each of the lips 138A–F have a threaded hole 140, used to align the rail with its respective one of the rail ties 134A–C

Vacuum System

Figure 6:
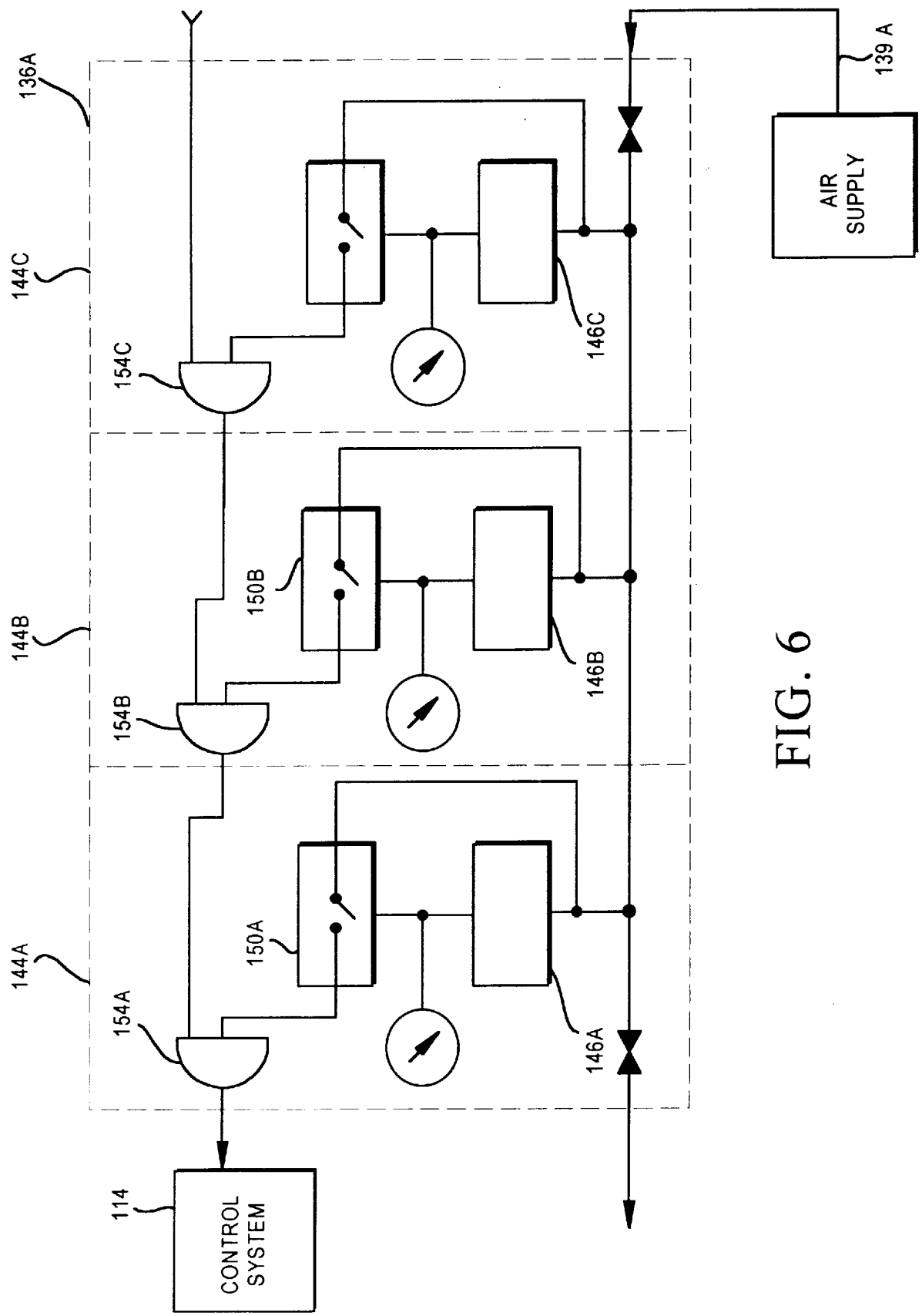
FIG. 6 is a schematic diagram of a plurality of vacuum generators of the external guide rails.
Figure 7:
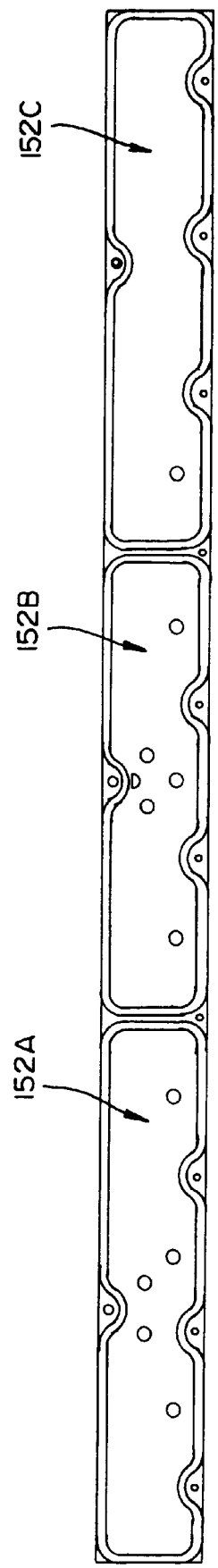
FIG. 7 is a plan view of a contact portion, including vacuum seals of the primary guide rails of the external guide rails.

The contact platforms 136A and 136B, as shown in FIG. 5, include a vacuum system having a plurality of vacuum generators 144A–F. FIG. 6 is a schematic diagram of the vacuum generators 144A–144C for the primary contact platform 136A, where each of the generators 144A–144C, respectively, has a vacuum pump 146A–146C, a vacuum gauge 148A–148C, and a vacuum switch 150A–150C. The vacuum generators 144A–144C are preferably PIAB™ generators (Part No. X 10). Each of the vacuum shown in FIG. 6, is in pneumatic communication with corresponding rubber gasketed vacuum pads 152A–152C, shown in FIG. 7, which are located on a side of the contact platform 136A contiguous with the panels 110 forming the lap joint 116. The secondary contact platform 136B has identical vacuum pumps 146D–146F, vacuum gauges 148D–148F and vacuum switches 150D–150F, as well as vacuum pads 152D–152F.

The tube portions 135A and 135B are hollow and carry an air flow pressurized to approximately 90–100 psi. The air is supplied off the tube portions 135A and 135B via air taps (not shown) to the vacuum generators 144A–144C, and 144D–144F, respectively, of the primary and secondary platforms 136A and 136B. The positive air pressure supplied by the tube portions 135A and 135B expands in one or more orifice ejector nozzles (not shown) of the vacuum generators 144A–144F, converting pressure and heat energy into motion energy. The compressed air jet increases speed rapidly, while the pressurized temperature of the air decreases, inducing a high vacuum flow, thereby creating a vacuum on a suction side of the vacuum pumps 146A–146F. Both the primary rail 130 and the secondary rail 132 connect and operate in the same manner, where the vacuum generators 144A–144F produce a vacuum in corresponding vacuum pads 152A–152F. The vacuum pads are isolated from one another so if one of the pads 152A–152F is lost, it will not affect the vacuum in the remaining pads.

As shown in FIG. 6, each of the vacuum generators 144A–144F has a pneumatic logic circuit including three AND gates 154A–154C, and three vacuum switches 150A–150C. The logic circuit verifies that a vacuum has been produced by a particular vacuum generator. When the vacuum pads 152A–152F have reached an acceptable level of vacuum, the pneumatic logic circuit creates and sends a vacuum present signal to the next vacuum generator 144. Each logic circuit "AND's" the previous vacuum signal with the current vacuum signal and sends it on to the next vacuum generator 144. The process repeats until the entire rail has been checked and the resulting signal is sent to the CPU 398 for processing, leading to a warning display or an E-stop system shutdown.

The vacuum applied by the vacuum generators 144A–144F must be sufficient to couple the external guide rails 102 to the lap joint 116 while it is supporting the outside end-effector 104, as shown in FIG. 5. The coupling force to the panels 110 forming the lap joint 116 must be sufficient for the external rails 102 to transfer up to 700 lbs. of force generated by the outside end-effector 104 to the panels 110 during fastener operations.

The vacuum system allows the external guide rails 102 to be completely supported by the panels 110 forming the lap joint 116 without the need of a support fixture. This allows the system 100 to be brought to any part being worked on, even when a joint is located in an inconvenient area that would not admit fixturing or large automated machinery. Also, because the external rails 102 are vacuum coupled to the lap joint 116, the external rails 102 follow the contour of the panels making up the joint, keeping the outside end-effector relatively normal to it. Further, since the vacuum pads 152A–152F are made of neoprene or rubber, the panels are not damaged during fastener operations.

The removable rail ties 134A–134C each include receptacles 156A–156C for engaging a key 122 of a respective one of the index pins 120. Once one of the receptacles 156A–156C has been engaged with the key 122, it positions the rail tie 134 in appropriate x,y coordinates relative to the lap joint 116. As shown in FIG. 5, the rail tie 134B, like each of the rail ties 134A–134C has two hand-tightened bolts 158A and 158B, that threadingly engage the threaded holes 140 in the lips 138B and 138E of the primary rail 130 and secondary rail 132, respectively. The bolts 158A and 158B properly locate the primary rail 130 and secondary rail 132 along the x-axis. Once corresponding bolts of another rail are engaged to their respective lips, the primary rail 130 and secondary rail 132 are also aligned along the y-axis.

The arrangement of the external guide rails 102 allows it to be entirely supported by the panels 110 forming the lap joint 116 using coordination holes 142 as reference points. The rail ties 134A–134C are aligned with their respective coordination holes using the key 122 of the index pins 120. The rail ties 134A–134C are then fastened to the primary rail 130 and the secondary rail 132, using features, i.e. the coordination holes, of the panels 110 as the only means of aligning the external rails 102 to the lap joint 116. Thereafter, the vacuum is applied, causing the external rails 102 and the outside end-effector 104 to be entirely supported by the panels 110 forming the lap joint 116.

Outside End-Effector Subsystem

The outside end-effector subsystem 104, as shown in FIGS. 8A–8E, includes an outside end-effector engagement assembly for lifting the outside end-effector 104 and slidingly engaging the outside end-effector 104 onto the external rails 102. The outside end-effector 104 also includes an outside tool positioning assembly for positioning modular component, such as drills and fasteners, relative to the indexing pins 120. The outside tool positioning assembly includes an external position detection subassembly, for detecting the indexing pins 120 and for measuring the distance traveled by the outside end-effector 104 from the last homed position. The outside tool positioning assembly also includes an outside end-effector drive subassembly for moving the outside end-effector 104 along the x-axis on the external guide rails 102, and a pressure foot subassembly 236 for clamping the lap joint at the area where a fastening operation is to occur. The outside end-effector 104 further includes a module movement subassembly 250 for positioning a drill/countersink module and a rivet drive/fastener feed module.

Figure 8B:
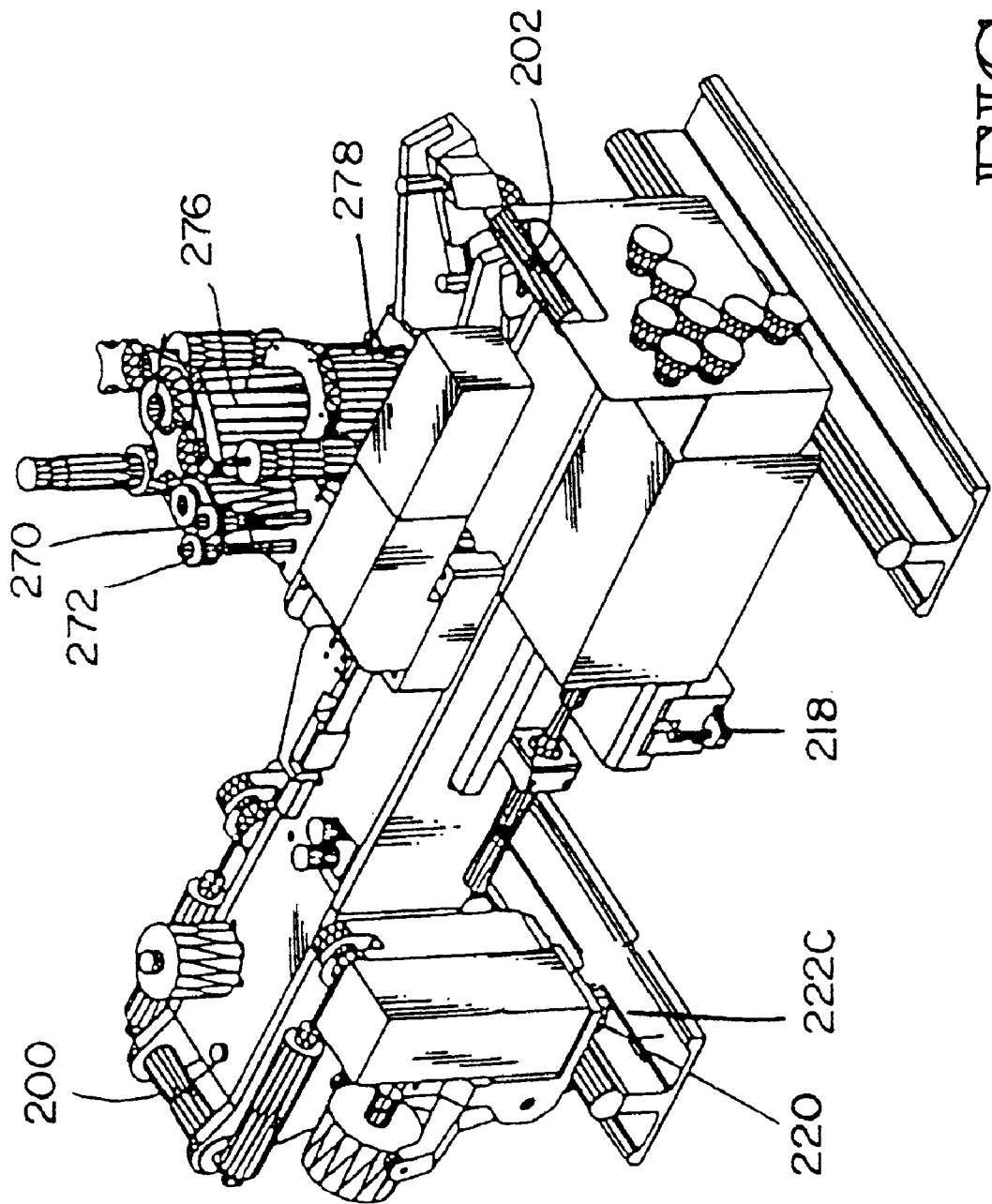
FIG. 8B is a perspective view from the lower left of the outside end-effector.
Figure 8C:
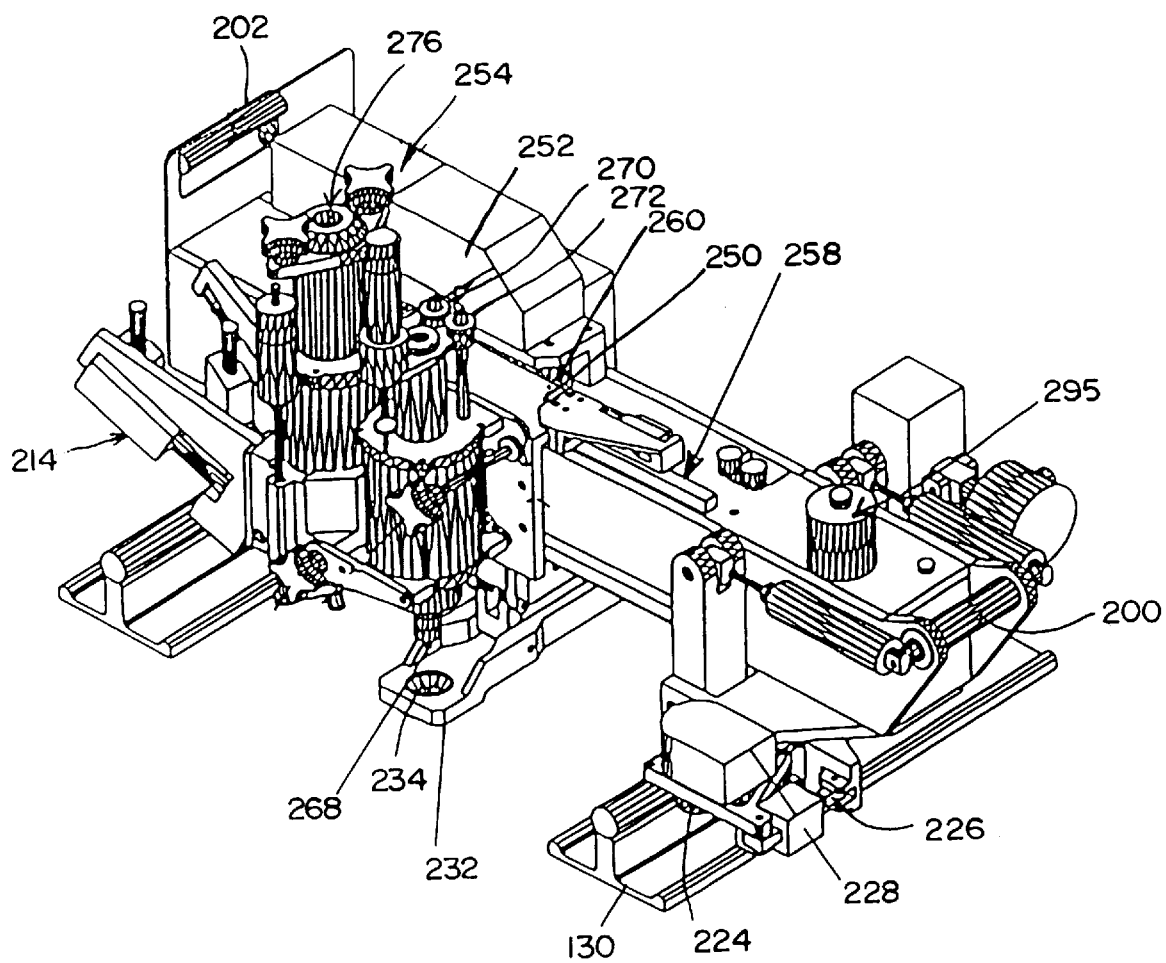
FIG. 8C is a perspective view from the upper right of the outside end-effector.
Figure 8D:
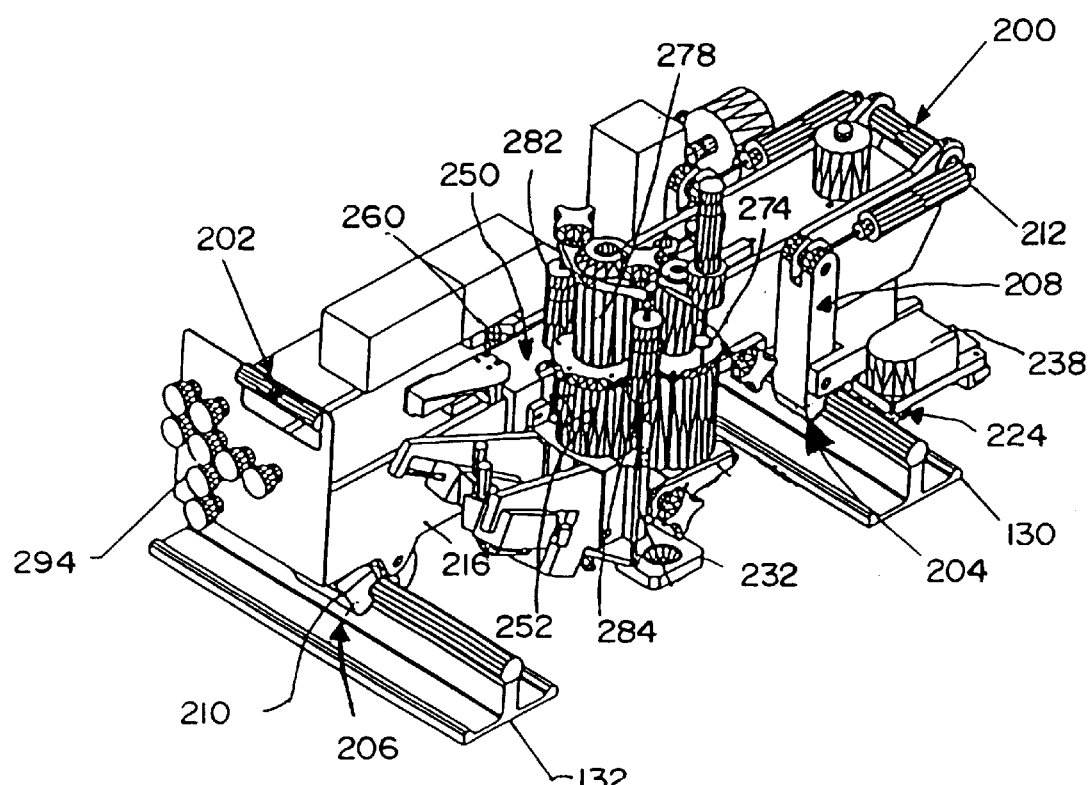
FIG. 8D is a perspective view from the lower right of the outside end-effector.

Outside End-Effector Engagement Assembly:

The outside end-effector engagement assembly, as shown in FIGS. 8A and 8D, includes a primary handle 200, and a secondary handle 202, which are used by an operator to lift the outside end-effector 104 onto the primary rail 130 and the secondary rail 132.

The outside engagement assembly also includes a primary clamshell bearing system 204, and a secondary clamshell bearing system 206, as shown in FIG. 8D, for allowing the outside end-effector 104 to be installed or removed anywhere along the length, i.e. x-axis, of the external guide rails 102. A primary pivot arm 208 of the primary bearing system 204 is opened or closed on the primary rail 130 by a primary air cylinder 212, as shown in FIG. 8D. In the same manner, a secondary pivot arm 210, of the secondary bearing system 206 is opened or closed on the secondary rail 132 by a secondary air cylinder 214, as shown in FIG. 8C.

In a preferred embodiment, the primary and secondary pivot arms 208 and 210 can be locked closed to prevent the outside end-effector 104 from falling off the external guide rails 102 if the unit were to experience an air pressure loss condition. This is accomplished by using a locking air cylinder (not shown) to move a tool pin (not shown) through the primary and secondary arms 208 and 210, respectively, and the main body 216 of the outside end-effector 104. The tool pin keeps the pivot arms from opening when pressure is lost. An optional push button (not shown) located on the main body 216 allows the operator to operate the locking air cylinder at will.

Outside End-Effector Tool Positioning Assembly:

External Position Detection Subassembly:

The external position detection subassembly, as shown in FIG. 8A, includes a homing sensor 218, and a final external position encoder 220.

The homing sensor 218, shown in FIG. 8A, is preferably a proximity sensor. When requested by the CPU 398, the homing sensor 218 detects the gap 125 within the key 122 of the selected one of the index pins 120 being homed to and re-establishes, i.e. re-zeros, its x,y coordinate system based on the nearby detected index pin 120. Preferably, when operating on an aircraft fuselage, the control system 114 will request the homing sensor 218 to locate an index pin 120 along the fuselage, i.e. re-zero, at every bay of the fuselage, where a bay is defined by two frames of the aircraft fuselage. By re-zeroing at every bay, inaccuracies from either fastener-induced growth of material or temperature variation can be significantly reduced. Thus, the outside end-effector 104 can maintain a high degree of positional accuracy by periodically re-calibrating its alignment based on the same structure of panels 110 forming the lap joint 116 which supports the outside end-effector 104.

The final external position encoder 220, as shown in FIGS. 8A and 8B, comprises a plurality of first wheels 222A–222C which engage above and beneath the primary rail 130. The first wheels 222A–222C move when the outside end-effector 104 moves relative to the primary rail 130. The external encoder 220 operates in a closed loop system reporting the position of the outside end-effector 104 to the control system 114 relative to the last homed position.

Outside End-Effector Drive Subassembly:

The outside end-effector drive subassembly for moving the outside end-effector 104 along the x-axis on the external guide rails 102, as shown in FIGS. 8C and 8D, includes a first friction drive wheel 224, a first friction air cylinder 226 for engaging the first friction drive wheel 224 to the primary rail 130. The first friction drive wheel 224 is rotated by an x-axis servo-motor 228 which drives the outside end-effector 104 along the x-axis. Since the first friction drive wheel 224 has no gears or teeth, no damage will occur to the lap joint 116 or the mini-riveter system 100 if the outside end-effector 104 encounters an obstacle while traveling along the x-axis. Instead of burning out a motor or "chewing up" components, the first friction drive wheel 224 simply spins in place without causing any damage. The external encoder 220 reports the location of the outside end-effector 104 to the control system 114 which, in turn, deactivates the x-axis servo-motor 228 when a designated position is reached.

Pressure Foot Subassembly:

The pressure foot subassembly 230, shown in FIGS. 8C–8E, 9A and 9B, applies a clamping pressure to a relatively small area of the lap joint 116 in support of fastening and drilling operations.

The pressure foot subassembly 230 includes a porthole clamp 232, shown in FIG. 9A having an orifice 234 sized to allow passage of a drill, countersink, or fastening device. The porthole clamp 232 is pressed against a relatively small area of the lap joint 116 to apply pressure around an area to be drilled and fastened. Preferably, the porthole clamp 232 is steel hardened to at least Rc 65, and is polished to 16 Rhr or smoother to prevent scratches to the panels 110 during clamp-up.

Figure 9B:
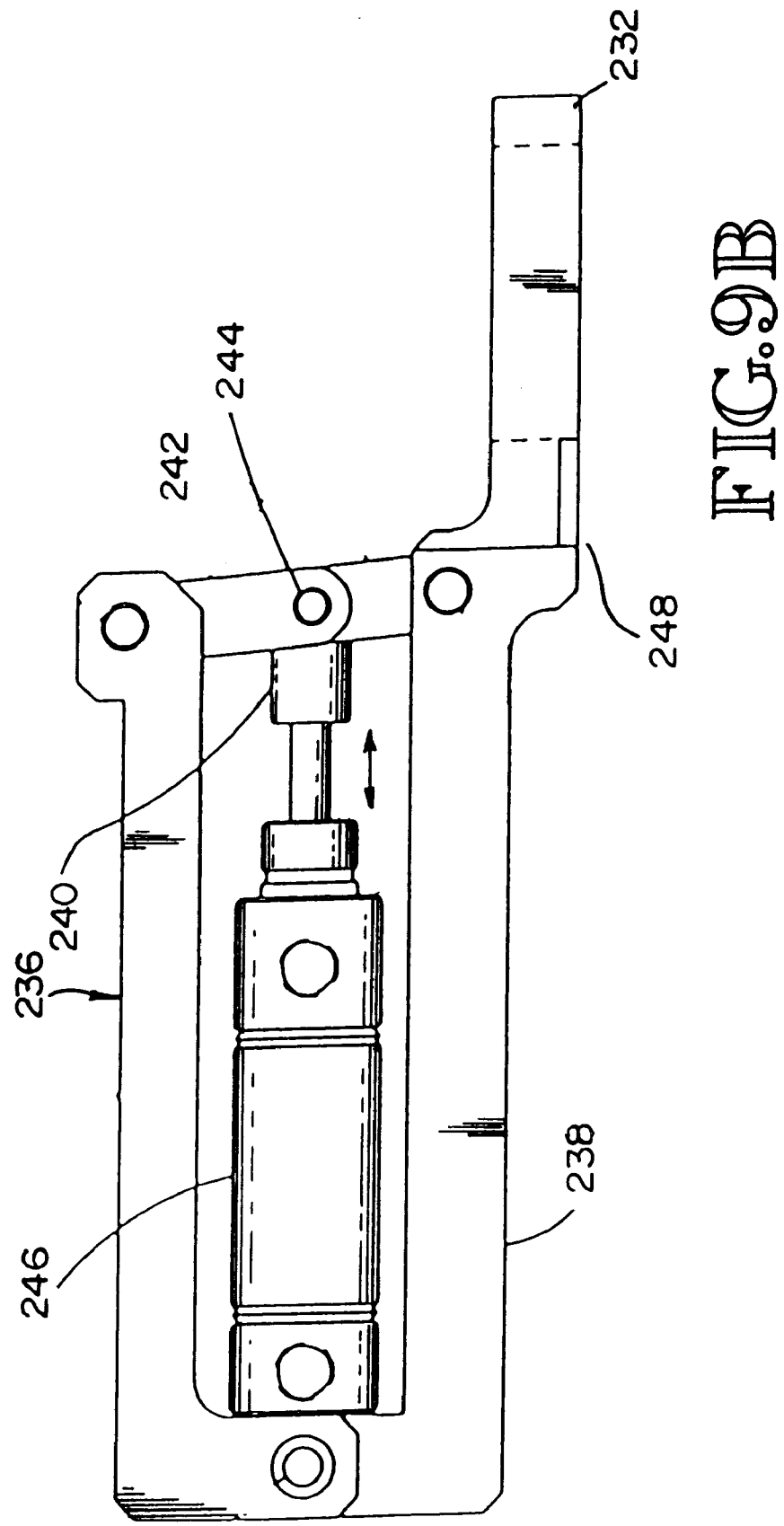
FIG. 9B is a side view of a frame and a mid-linkage of the pressure foot subassembly.

The pressure foot 230 also includes a U-shaped frame 236, shown in FIGS. 8E and 9B. A lower arm 238 of the frame 236 is coupled to the porthole clamp 232. A mid-linkage 242 flexibly couples an end of an upper arm 240 and an end of the lower arm 238. The mid-linkage 242 includes a joint 244, which is in physical contact with a clamping air cylinder 246. When the clamping air cylinder 246 is extended, the mid-linkage 242 and the U-shaped frame 236 are expanded, causing pressure to be applied between the outside end-effector 104 and the lap joint 116.

A sensor 248, as shown in FIG. 9B, is capable of detecting clamp-up forces applied to the lap joint 116 of up to 700 lbs.

Preferably, the pressure foot 230 via the porthole clamp 232 is capable of providing a manually adjustable clamp-up pressure ranging from 100–500 lbs. For optimal results a pressure of 300 lbs. is applied. Further, in a preferred embodiment, the dwell time of the clamp 232 prior to drilling is between 1 and 20 seconds.

By applying clamp-up pressure to a localized region during drilling, there is no burring occurring between the panels 110 of the lap joint 116. If an inner burr were produced and allowed to remain, it would greatly reduce the fatigue life of the panels 110. Further, no chips or shavings are falling between the panels 110 of the lap joint 116. Thus, the panels 110 need not be disassembled, filed/de-burred, cleaned, sealed, and then reassembled as previously required. The elimination of these steps affords a significant savings in time and cost. Further, the use of a clamp-up system that mounts on the parts/panels 110 being assembled is unique and allows a much more flexible clamp-up system.

The pressure foot subassembly 230, as shown in FIG. 8E, is moved along the y-axis from row to row of rivets along the width of the lap joint 116 by a clamp air motor 248 and a clamp ball screw 250. The position of the subassembly 230 is determined by a LVDT position measuring device 251 connected to the pressure foot 230, as shown in FIG. 9A. The control system 114 reads a signal produced by the LVDT device 251 to verify the position of the porthole clamp 232. If the porthole clamp 232 is out of position, then an air valve (not shown) is actuated to drive the clamp air motor 248 which then moves the porthole clamp 232 into the correct position.

Module Movement Subassembly:

The outside end-effector 104 uses the module movement assembly 250, shown in FIGS. 8C–8E to align a machine axis of a drill/countersink module 252 or a rivet drive/fastener feed module 254 with the orifice 234 of the porthole clamp 232 and the section or area of the lap joint 116 to be fastened.

The module movement assembly 250 includes an external module carriage 256 slidingly engaged with the main body 216 of the outside end-effector 104 along a linear bearing 258. A module servo-motor 260 moves the drill/countersink module 252 and the rivet drive/fastener feed module 254 from a position where the drill/countersink module 252 was aligned to operate to a position where the rivet drive/fastener feed module 254 is aligned to operate, from row to row along a selected column of rivets.

Drill/Countersink Module:

The drill/countersink module 252, as shown in FIGS. 8A–8E, prepares a position or area of the lap joint 116 for receiving a fastener by drilling and countersinking a hole at the position. The drill module 252 includes drill unit 262 which is pneumatically driven, and interchangeable. The drill unit 262 maybe interchanged with a different sized unit by removing it from a drill holder 264 which is horizontally fixed and vertically slidable relative to the external carriage 256 of the module movement assembly 250. The drill unit 262 is removed from the drill holder 264 by unscrewing a quick release drill knob 266, as shown in FIG. 8A.

The drill unit 262 rotates an integral drill bit and countersink 268, as shown in FIGS. 8C and 8E. The integral drill bit and countersink 268 allows the position of the lap joint 116 to be both drilled and countersunk with one plunge of the drill unit 262.

The drill/countersink module 252 further includes first and second pneumatically powered drill plunging air cylinders 270 and 272, respectively, coupled to the external carriage 256 of the module movement assembly 250 and the drill holder 264 for moving the drill unit 262 along the z-axis normal to the lap joint 116. The drill module 252 includes a stop 274 to limit the motion of the integral drill bit and countersink 268 into the lap joint 116 to provide the desirable countersink depth. The stop 274 also acts as a fail safe, preventing overdriving of the drill bit and countersink 268 into the lap joint 116. A Boelube reservoir 275, shown in FIGS. 8A and 8C, provides lubricant during the drilling process to enhance hole quality and extend the life of the drill bit and countersink 268.

Rivet Drive/Fastener Feed Module:

The rivet drive/fastener feed module 254, as shown in FIGS. 8A–8E, loads a rivet/fastener into a hole drilled by the drill module 252 and then upsets the rivet in the hole in a manner that assures a high degree of accuracy, preventing rework.

The rivet module 254 includes a rivet drive unit 276, which is pneumatically driven and interchangeable. The rivet drive unit 276 may be interchanged with a different drive unit, allowing the rivet module 254 to accommodate various fastener requirements. The interchange of the drive units is accomplished by removing the rivet drive unit 276 from a rivet drive holder 278, which is horizontally fixed and vertically slideable relative to the external carriage 256 of the module movement assembly 250, and replacing it with a new rivet unit. The rivet drive unit 276 is removed from the rivet drive holder 278 by unscrewing first and second quick release rivet knobs 280A and 280B, respectively, as shown in FIG. 8A.

The rivet module 254 further includes a first and second pneumatically powered rivet seating plunger 282 and 284, respectively, as shown in FIG. 8D, coupled to both the rivet drive holder 278 and a cylindrical portion 279 of the external carriage 252 for moving the rivet unit 276 along the z-axis. The rivet drive unit 276 drives a rivet driver head (not shown) used to impact a head of the rivet, resulting in the deformation/upsetting of the rivet. The first and second rivet seating plunger 282 and 284 seat the rivet driver head against the head of the rivet to be upset.

The rivet module 254 also includes a fastener supply system. A plurality of rivets are sorted and queued by a vibratory bowl 286, shown in FIG. 15, and pneumatically (using air pressure) fed to the rivet module 254 via feed tubes 288A and 288B.

Figure 10A:
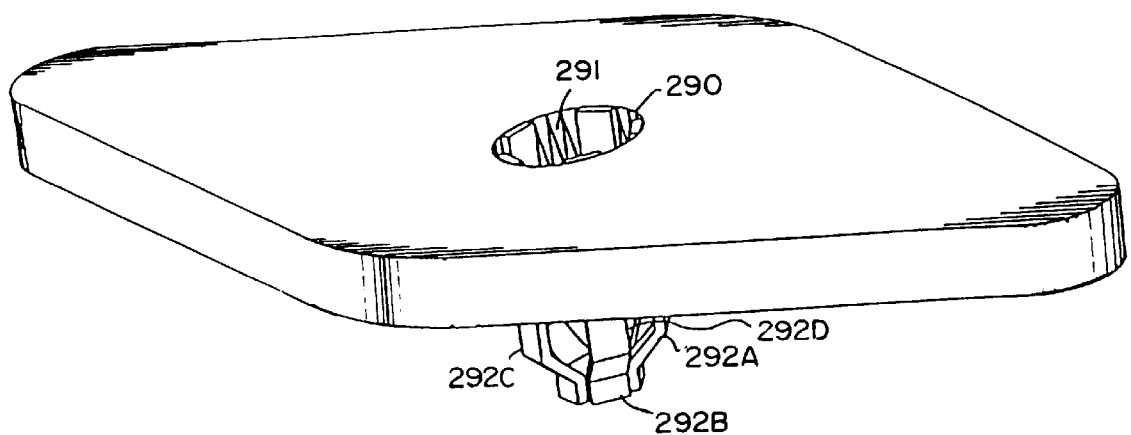
FIG. 10A is a bottom view of a fastener feed fingers of the outside end-effector.
Figure 10B:
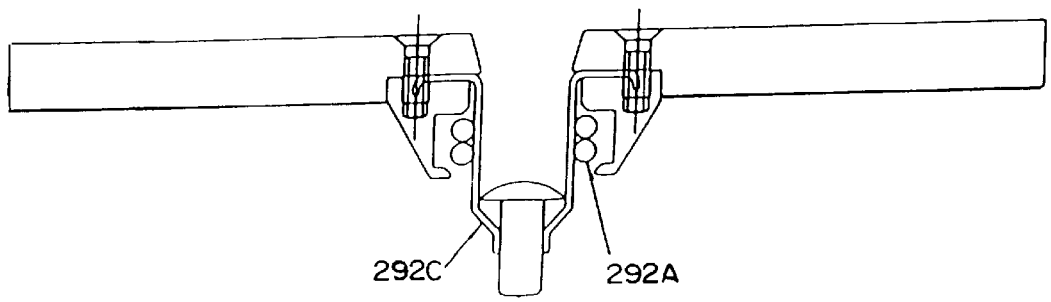
FIG. 10B is a side view of the fastener feed fingers of the outside end-effector.

The rivets delivered by the rivet feed tubes 288A and 288B are fed to a set of fastener feed fingers 290, as shown in FIGS. 8E, 10A and 10B. The rivet fingers 290 are pneumatically powered to hold the rivet while it is inserted into the hole to be fastened.

As shown in FIGS. 10A and 10B, the feed fingers 290 include a circular structure 291, having an inner orifice, where four fingers 292A–292D are attached to a respective side of the inner orifice of the circular structure 291. The feed fingers 290 lower the rivet into the hole to be fastened using the first and second pneumatic seating plungers 282 and 284, respectively.

Interfaces:

The outside end-effector 104 also includes a plurality of electrical and pneumatic interfaces. For example, a plurality of pneumatic and electrical connections are located at bottom connectors 294, shown in FIGS. 8D and 8E. The pneumatic bottom connectors 294 supply air to the air cylinders, pneumatic riveter and drill units discussed above. The electrical group of the bottom connectors 294 supply power to the above-discussed servo motors, and the power is distributed via an electrical service box 296, shown in FIG. 8A. Preferably, the bottom connectors are quick disconnects allowing the outside end-effector 104 to be easily moved, serviced, and installed.

Internal Guide Rails

Figure 11:
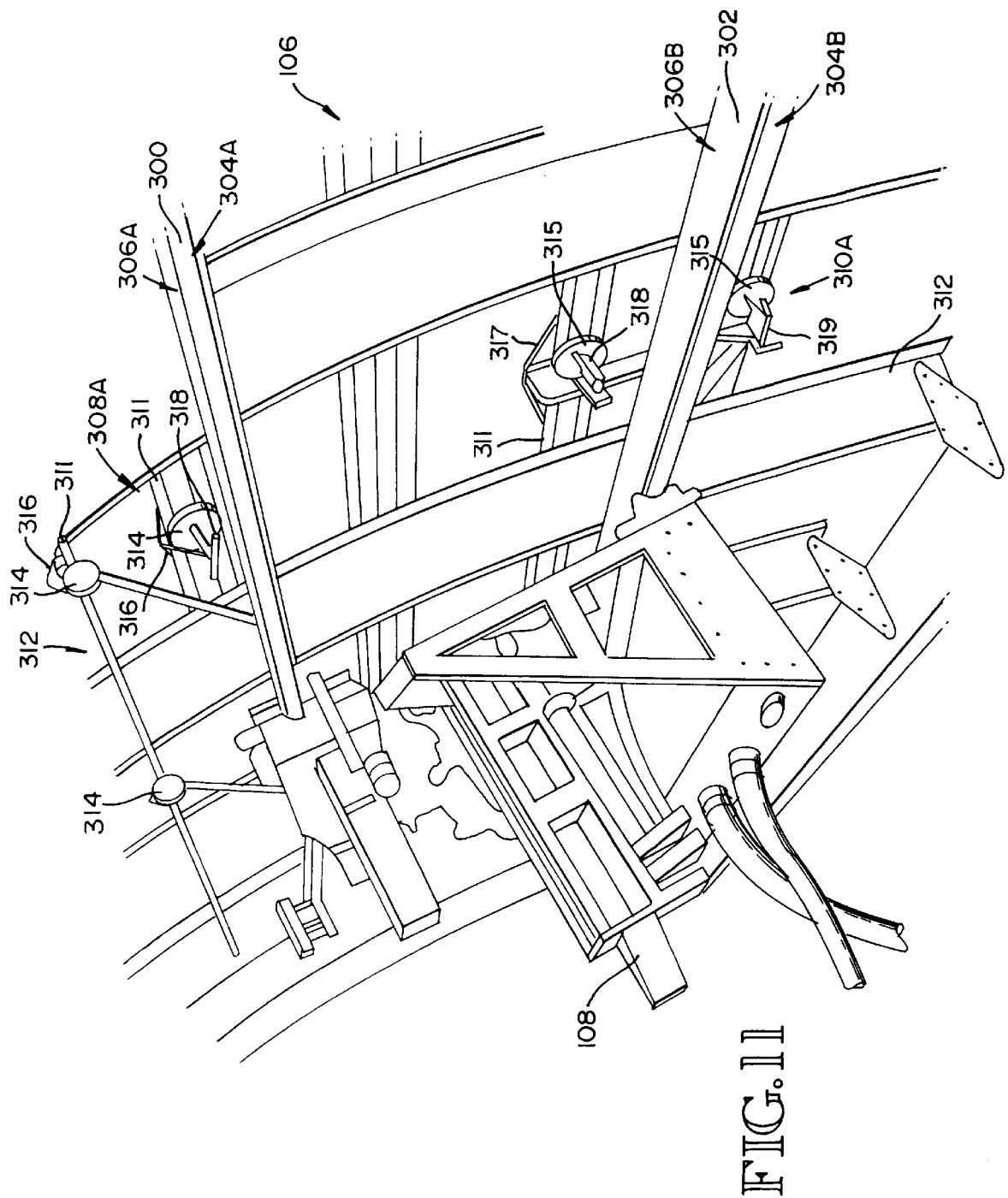
FIG. 11 is a perspective view of the inside end-effector and internal guide rails of the mini-riveter system.

The internal guide rails 106, as shown in FIG. 11, are positioned on the inside surface of the lap joint 116. The internal guide rails 106 support the inside end-effector 108 and transfer forces generated by the inside end-effector 108 during fastening operations to the panels 110 forming the lap joint 116.

The internal guide rails 106 include an upper rail 300 and a lower rail 302. Each of the upper and lower rail 300 and 302, respectively, includes an upper and lower tube portion 304A and 304B, for slideable engagement with the inside end-effector 108. The upper and lower-rail 300 and 302 also have an upper and lower bar portion 306A and 306B, which are mechanically coupled to the respective tube portion 304A and 304B. The upper and lower bar portions 306A and 306B are coupled to a plurality of upper and lower attachment brackets 308A–308C, and 310A–310C, respectively, as shown in FIG. 11.

Attachment Brackets:

As shown in FIG. 11, the upper guide rail 300 is hung by the upper attachment brackets 308A–308C by hooking the brackets 308A–308C to a feature previously coupled to the inside surface of the panels 110 forming the lap joint 116. In a similar manner, the lower guide rail 302 is stood upon the attachment brackets 310A–310C. In one embodiment, as shown in FIG. 11, the present system is used within an aircraft fuselage section where the features include a plurality of stringers 311 positioned horizontally at intervals along the inside surface of the panels 110 and intersected by a plurality of frames 312 defining the bays within the fuselage section.

The attachment brackets 308A–308C and 310A–310C are hooked behind a T-shaped portion of the stringers 311 and adjacent to one of the frame members 312. As shown in FIG. 11, the attachment brackets 308A–308C and 310A–310C are each clamped to the stringers 311 with respective circular plates 314A–314F, and 315A–315F, which contact a face of the stringers 311 and respective hooks 316A–316F and 317A–F, which reach behind the T-portion of the stringer 311. Respective levers 318A–318F and 319A–319F draw the circular plates 314A–314F, 315A–315F and the hooks 316A–316F, 317A–317F together to lock both the upper and lower guide rails 300 and 302 onto their respective stringers 311.

The attachment brackets 308A–308C and 310A–310C, as shown in FIG. 11, attach the internal guide rails 106 to the inside surface of the panels 110, or airframe, forming the lap joint 116. In the present embodiment, the stringers 311 and frame members 312 are aligned by coordination holes. Therefore, the internal guide rails 106 will benefit from the self aligned features coupled to the panel skins 110 and will, in turn, be aligned with the lap joint 116 without the need for externally supported fixturing.

In an alternative embodiment, the attachment brackets 308A–308C and 310A–310C may be varied in length or be adjustable in length of allow attachment to irregular features coupled on the inside surface of the panels 110. If the inside surface has no features, then the above-described vacuum generators and pads could be used to replace the attachment brackets 308A–308C and 310A–310C.

The arrangement of the internal guide rails 106 allows an end-effector to be installed inside a fuselage or other restricted area which would not normally support a fixture or large mechanism required to accomplish the same task.

Inside End-Effector

Figure 12A:
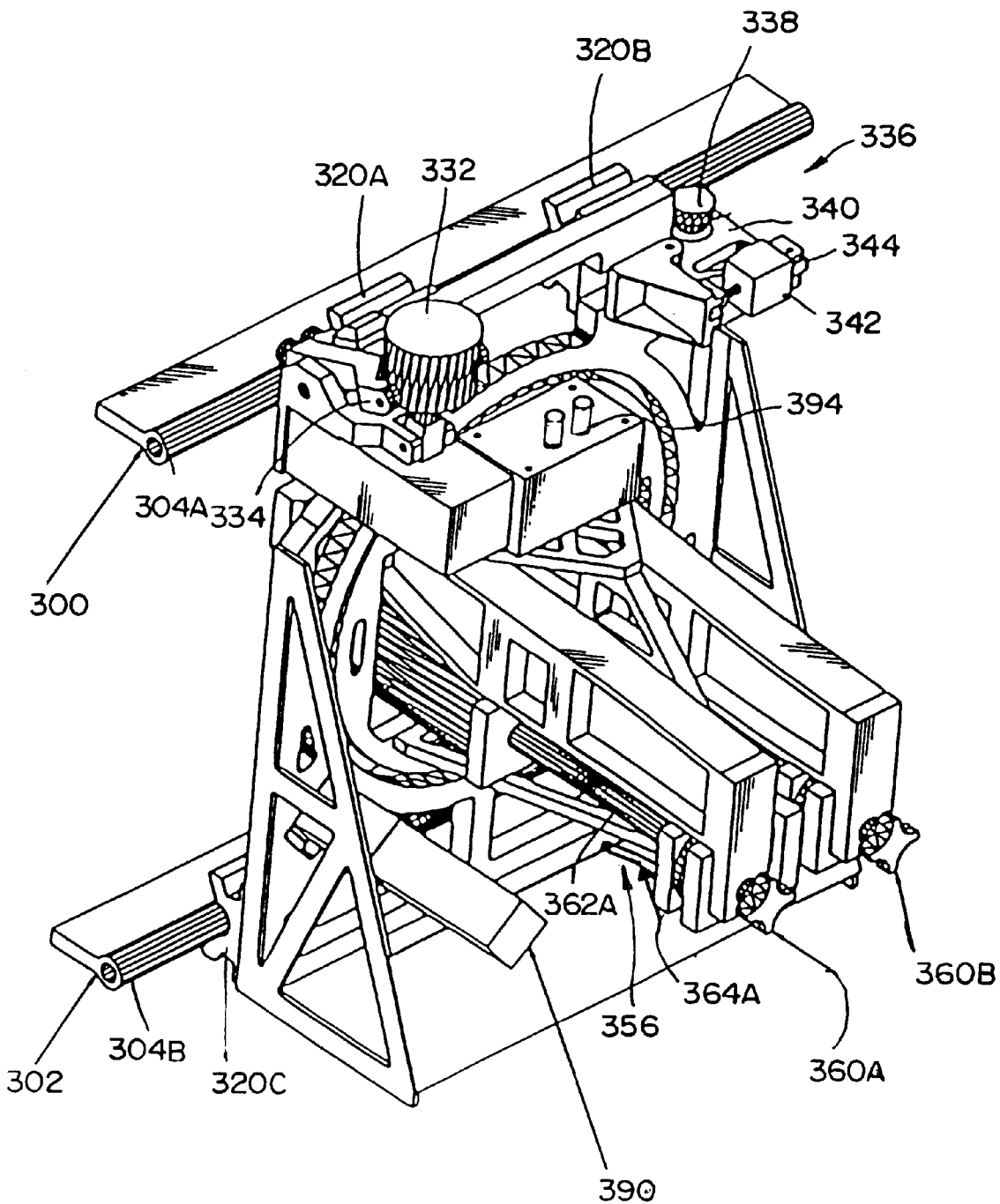
FIG. 12A is a perspective view of the inside end-effector.
Figure 12B:
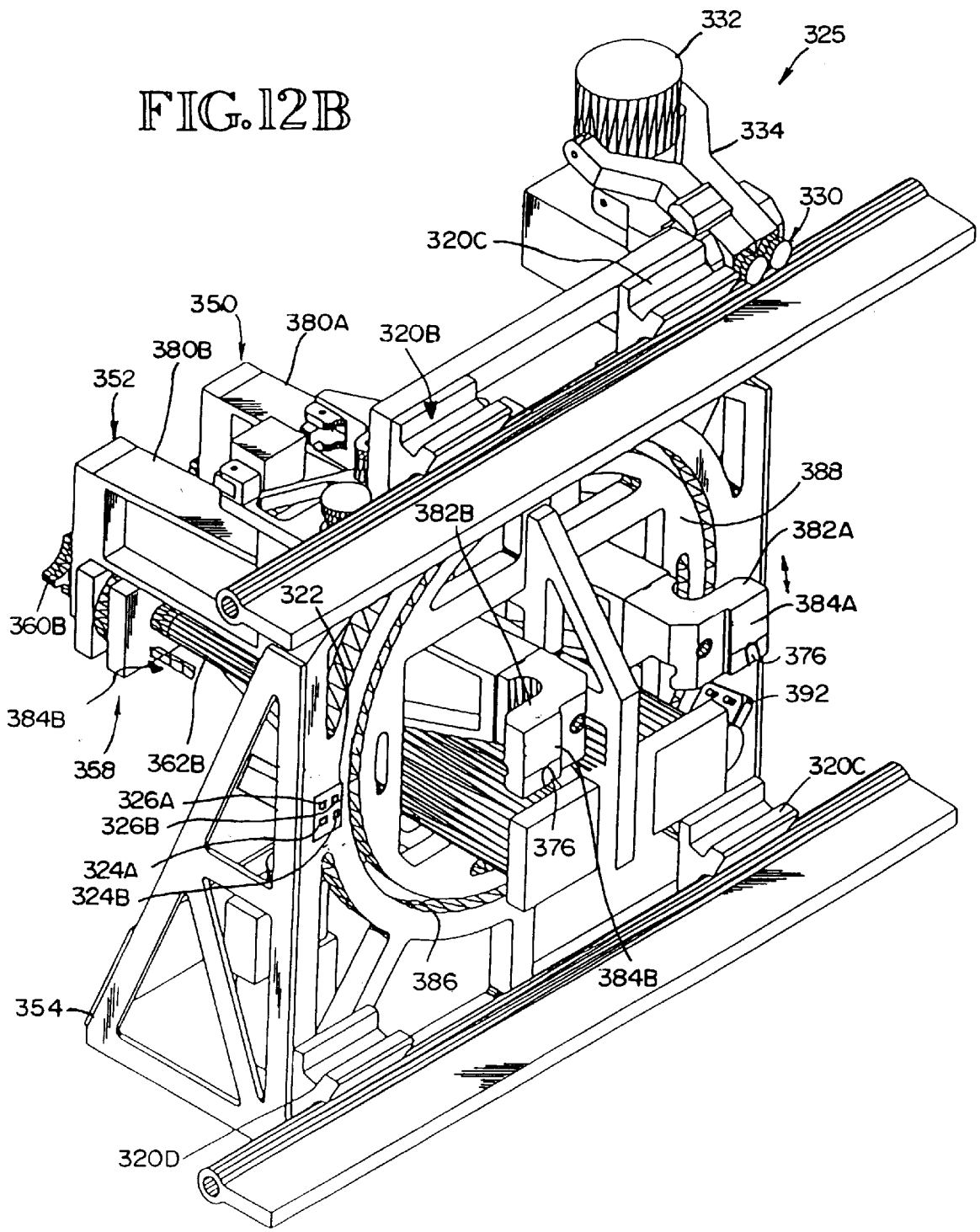
FIG. 12B is a perspective view of the bottom of the inside end-effector.

The inside end-effector 108, as shown in FIGS. 12A and 12B, includes an inside end-effector engagement assembly for allowing the inside end-effector 108 to slide along the internal guide rails 106, an inside tool positioning assembly for accurately positioning bucking bar modules along an x'-axis (parallel to the inside guide rails 106) relative to the index pins 120 inserted in the lap joint 116, and a rotational carriage assembly for moving the bucking bar modules along a y'-axis (perpendicular to the inside guide rails 106) relative to the index pins 120.

Engagement Assembly:

The inside end-effector engagement assembly includes four inside standard bearings 320A–320D, as shown in FIGS. 12A and 12B. The inside end-effector 108 is loaded at the outside end of the internal guide rails 106 by threading the internal guide rails 106 into the area defined by the standard bearings 320A–320D. By locking the inside end-effector 108 to the internal guide rails 106 in this manner, the inside end-effector 108 is fail safe, and much lighter in weight than a unit locked in place with air cylinders.

Tool Positioning Assembly:

The tool positioning assembly includes an internal position detection subassembly, and an inside end-effector drive subassembly 336.

Internal Position Detection Subassembly:

The internal position detection subassembly, as shown in FIG. 12B, includes an internal homing sensor 322 having first and second helium-neon lasers 324A and 324B, and respective first and second Charge Coupled Devices (CCD's) 326A and 326B. The first and second lasers 324A and 324B are directed toward the reflecting square 128 of the index pins 120 and their beams are parallel and spaced a distance just short of the width of the reflecting square 128, between 1 and 5 mm, preferably 3 mm. Accordingly, as the inside end-effector is moved along the length of the lap joint 116 when both the first and second CCD's 326A and 326B simultaneously read their respective laser beams as being reflected by the reflecting square 128, the inside end-effector 108 has been homed to a zero position on the x', y' coordinate system defining the inside surface of the lap joint 116. Preferably, the determination that the inside end-effector 108 has been homed is made by the control system 114.

The internal position detection subassembly also includes an internal final position encoder 328, shown in FIG. 12B, which determines the distance Δx' that the inside end-effector 108 has traveled along the internal guide rails 106 from the last measured home position, as defined by the index pins 120.

The internal encoder 328, as shown in FIGS. 12A and 12B, includes a two-wheel detector 330 that moves relative to the upper guide rail 130, where the number of rotations and hence the distance traveled by the detector 330 is indicated by a signal to the control system 114 and is used to determine the position of the inside end-effector 108. As shown in FIGS. 12A and 12B, the two-wheel detector 330 is engaged with the upper rail 300 using a detector air cylinder 332 which, when activated, pivots an arm 334 causing the two-wheel detector 330 to move against the upper rail 300.

Inside End-Effector Drive Subassembly:

The inside end-effector drive subassembly 336, as shown in FIG. 12A, moves the inside end-effector 108 along the internal guide rails 106. The inside drive subassembly 336 includes an internal friction drive wheel 338 which is driven by an x' axis servo-motor 340. The use of the internal friction drive wheel 338 eliminates problems encountered when using gears or teeth. If the inside end-effector 108 were to encounter an obstacle, the internal friction drive wheel 338 would simply spin in place without causing any damage to either the inside end-effector 108 or the internal guide rail 106.

The internal friction drive wheel 338 is engaged with the upper rail 300 by a second drive air cylinder 342 which, when activated, pivots a drive arm 344, causing the internal friction wheel 338 to move up against the upper rail 300.

Rotational Carriage Assembly:

The rotational carriage assembly of the outside end-effector 108 rotates a left-hand (LH) bucking bar 350 and a right-hand (RH) bucking bar 352, as shown in FIG. 12B, relative to an inside frame 354 and the upper and lower guide rails 300 and 302, respectively.

Bucking Bar Modules:

The rotational carriage assembly includes a LH bucking bar module 356 and a RH bucking bar module 358, as shown in FIGS. 12A and 12B.

Both the LH bucking bar module 356 and the RH bucking bar module 358 include LH and RH quick release knobs 360A and 360B, respectively, as shown in FIG. 12A, allowing the two bucking bars to be easily interchanged with bucking bars having bucking dies of different shapes, sizes, and materials suited to a particular task. With this arrangement, the bucking bars can be easily swapped on the fly.

Further, the LH bucking bar module 356 and the RH bucking bar module 358 include a LH retract/extend cylinder 362A, and a RH retract/extend cylinder 362B, respectively. The LH and RH retract/extend cylinders 362A and 362B are pneumatically driven, and respectively cause the LH bucking bar 350 and the RH bucking bar 352 to move along the Z'axis normal to the lap joint 116 on the inside surface of the panels 110.

Protrusion Sensor:

The LH and RH bucking bar modules 356 and 358, respectively, also include a LH protrusion sensor 364A and RH protrusion sensor 364B, as shown in FIGS. 12A, 12B and 13A–C, which are used to measure the length of the shank of a rivet 372 protruding from the inside surface of the lap joint 116.

Figure 13A:
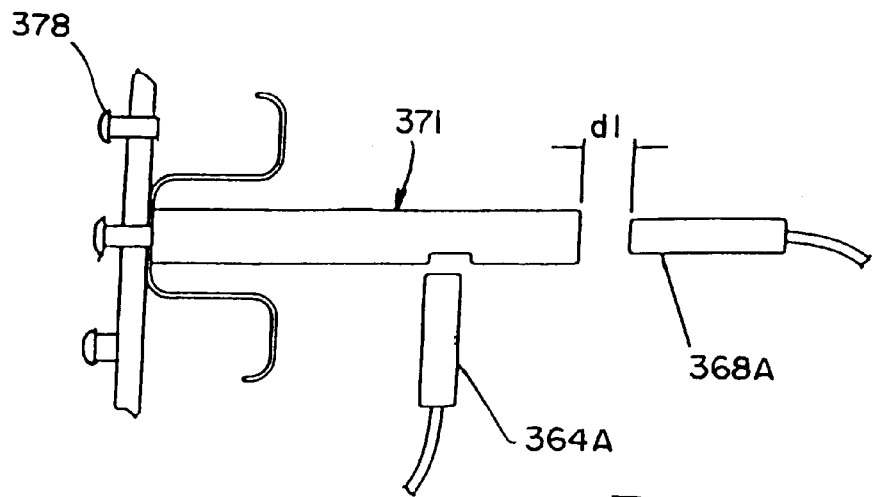
FIGS. 13A–13C are side views of a rivet protrusion sensor of the inside end-effector where.
Figure 13B:
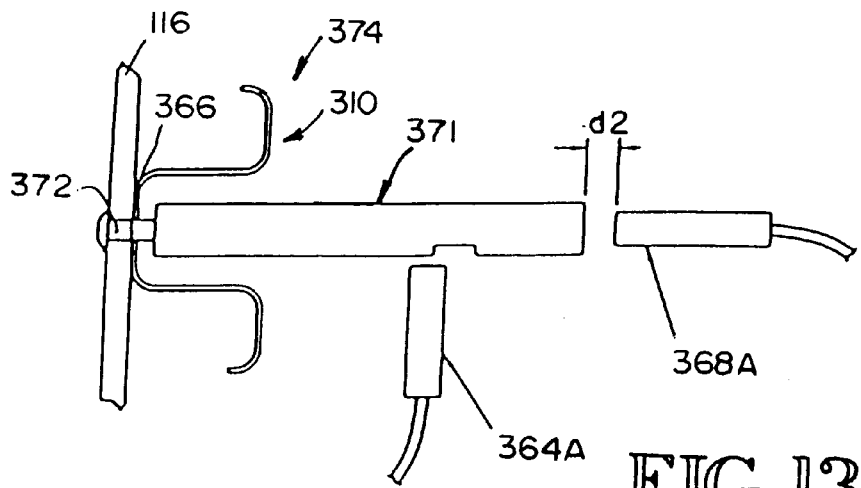

The LH and RH bucking bar modules 356 and 358 move the respective LH and RH bucking bars 350 and 352 along the z' axis to three basic positions. In a first position, the LH and RH bucking bars 350 and 352, respectively, are fully retracted to clear away from obstructive features attached to the inside surface of the panels 110, allowing the inside end-effector 108 freedom of movement. In the second position, as shown in FIG. 13A, one of the bucking bars 350 and 352 is clamped against the inside surface of the panels 110 against an area to be fastened prior to and during a drilling operation. During this operation, the protrusion sensors 364A and 364B measure a distance (d1) from a fixed sensor component 368A and 368B. In the third position, one of the bucking bars 350 and 352 is driven against a shank 366 of a rivet 372 inserted into the newly drilled hole used to fasten the position of the lap joint 116. Here, the protrusion sensor 364A measures a distance (d2) from the fixed sensor component 368A. The two values (d1) and (d2) are sent to the control system 114, which processes this information to determine the length of the shank 366 protruding from the inside surface. The length of the shank 366 is compared against a table value of rivet lengths to determine whether the proper rivet has been installed in the hole and, if so, whether it is in tolerance.

Figure 13C:
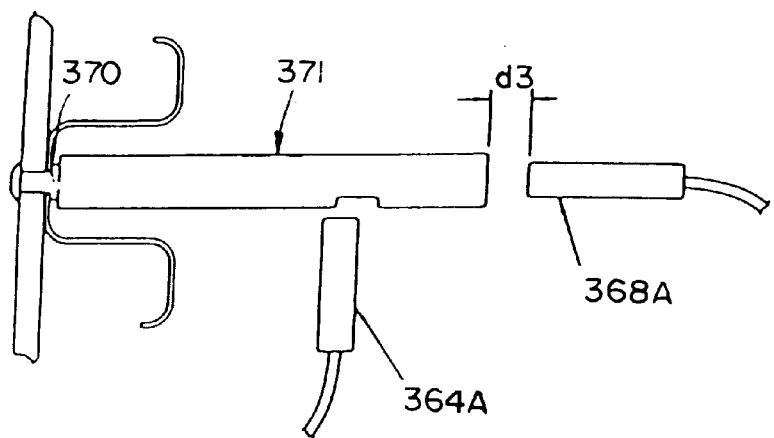

As shown in FIG. 13C, the LH protrusion sensor 364A continues to monitor the length (d3) of the shank, as it is deformed into a button 370. In a preferred embodiment, the signal from the LH protrusion sensor 364A is processed by the control system 114 to determine when a proper sized button has been formed (i.e., d3=proper button size indicated by table) and to immediately stop the rivet driver unit 276 from upsetting the rivet. This feedback system ensures a properly sized and seated rivet for each fastening operation.

The operation of the RH bucking bar module 358 and the RH protrusion sensor 364B operate in an identical manner to the LH bucking bar module 356 and the LH protrusion sensor 364A, as described above and shown in FIGS. 13A–13C.

Bucking Bar Dies:

The LH and RH bucking modules 356 and 358, respectively, hold and position the LH and RH bucking bars 350 and 352. Either of the LH or RH bucking modules 356 and 358, respectively, can hold and position a straight bucking bar 371, as shown in FIGS. 13A–13C, and 14A. The straight bucking bar 371 can be swapped with either the LH or RH bucking bars 350 and 352, when the inside end-effector 108 is upsetting a rivet, such as the rivet 372 shown in FIG. 13B, that is not obstructed by a T-shaped portion 374 of the stringer 311. The straight bucking bar 371 has a die with a first gap 376 for receiving a drill bit during the drilling operation. The alignment of the first gap 376 and the drill bit extends the life of the drill bit and countersink 268 as well as the straight bucking bar 371.

Figure 14D:
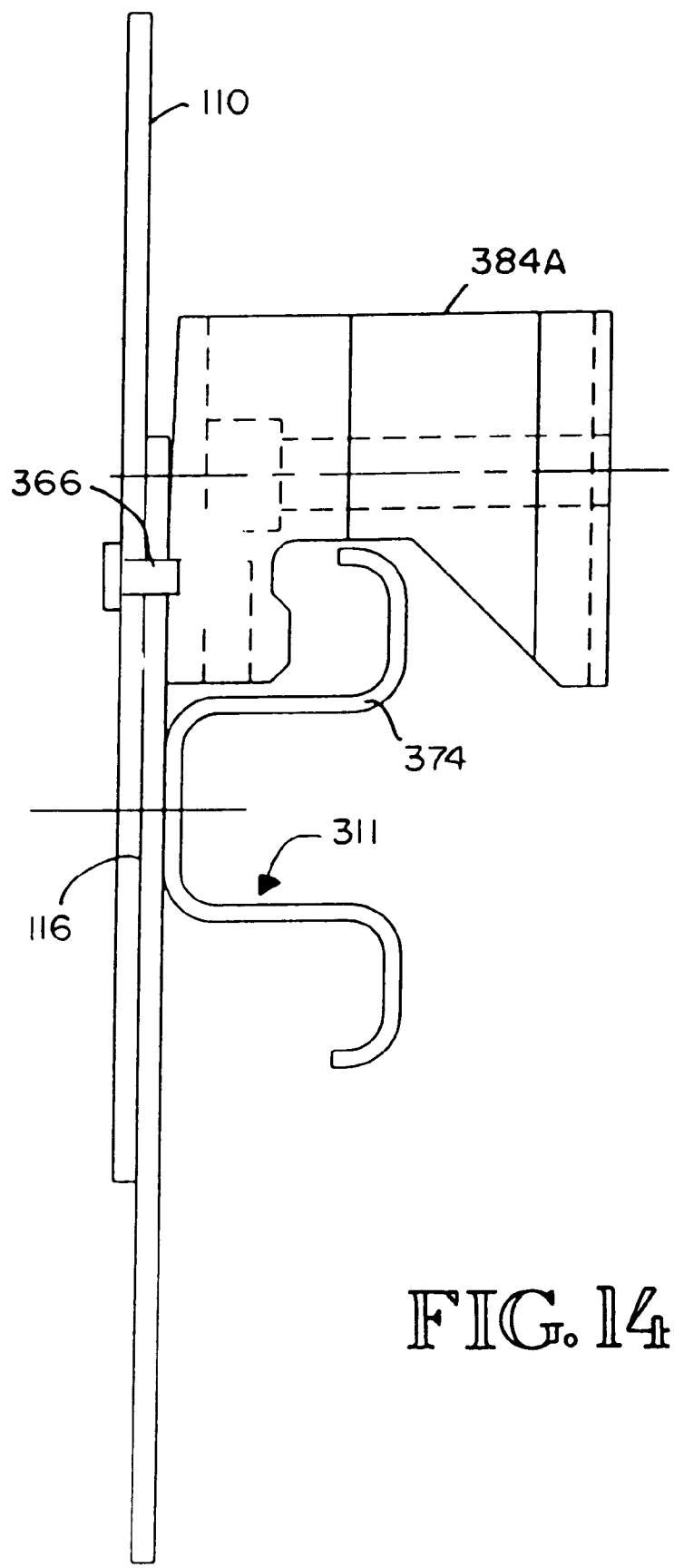
FIG. 14D is a side view of a left-hand bucking bar inserted between a lap joint and a stringer.

To solve the problem of fastening obstructed rivets, such as a top rivet 378 shown in FIG. 13A, the LH and RH bucking modules 356 and 358, respectively, cause the LH and RH bucking bars 350 and 352, respectively, to rotate behind the T-shaped portion 374 of the stringer 311, as shown in FIG. 14D. The LH and RH bucking bars 350 and 352 each include a LH and RH aluminum arms 380A and 380B, and LH and RH "L-shaped" bucking dies 382A and 382B, as shown in FIGS. 12B, 14B, and 14C. The LH and RH "L-shape" of the bucking dies 382A and 382B allow the dies to slide behind an obstruction, such as the T-portion 374 of the stringer 311. The bucking dies 382A and 382B may have double offsets built therein, where one offset is for getting behind frames and the other offset is forgetting behind the stringers 311.

Conventional bucking dies are formed from steel. Unfortunately, when the L-shaped dies are formed from steel, the rivets formed using these dies are severely clinched (i.e. clubfoot) buttons. Further, unusually long drive times are needed to upset the rivet. To counter these problems, it was determined that a thin section 384A and 384B of the bucking dies 382A and 382B, as shown in FIG. 12B, was vibrating an unacceptable amount during riveting operations. After the problem was identified, solutions were attempted using finite element analysis, data gathering observations, and configuration variation. As a result, it was determined that a material having a density of between 14.3–14.5 G/cm$^3$ was required. Further, the material should have a compressive strength of 650,000 psi, a minimum transverse rupture of 420,000 psi and a hardness of 72–74 Rc. Accordingly, the L-shaped bucking dies 382A and 382B are preferably formed using Tungsten Carbide™ from the Carbide Corporation which meets the above requirements. More preferably, a Tungsten Carbide™ grade CD-337 or ISO code G-20 or C-code C-11 is used to form the LH and RH bucking dies 382A and 382B. Tungsten Carbide™ has twice the density of steel and has almost twice the strength. By using Tungsten Carbide™ as the material forming the LH and RH bucking dies 382A and 382B, respectively, the clinching problem was eliminated and drive times were reduced to normal. This material could be used to improve the riveting process any time a die must undergo torsion or other torque-induced distortion during rivet deformation, including the manual process.

Rotational Turret Subassembly:

The rotational carriage assembly of the inside end-effector 108 includes a rotational turret subassembly for rotating the LH and RH bucking bars 350 and 352, respectively, along an a-axis, which rotates about the z' axis. The LH and RH bucking bars 350 and 352 are rotated and extended so that the L-shaped bucking dies 382 and 382B, respectively, can be positioned between the rivet shank 366 and an obstruction, such as the stringer 311, shown in FIG. 14D. Rotation of the turret subassembly in effect moves the rivet bucking dies 382A and 382B to a pre-selected position (x', y') by rotating the LH and RH bucking bars 350 and 352 on the a-axis.

The rotational turret subassembly, as shown in FIG. 12B, includes a turret bearing 386, which allows rotation of the LH and RH bucking bar modules 356 and 358, which are mounted to a rotating support 388, relative to the inside frame 354. The rotation of the rotating support 388 is driven by a rotational servo-motor 390, as shown in FIG. 12A.

The position of the rotating support 388 and hence the LH and RH bucking bars 350 and 352 is monitored and reported to the control system 114 by a rotational encoder 392, as shown in FIG. 12B. When a selected one of the bucking bars 350 and 352 has reached its predetermined position, the CPU 398 shuts off the rotational servo-motor 390 and proceeds with a drilling or fastening operation.

The inside end-effector 108 includes a plurality of pneumatic and electrical connections 394. Preferably, these connections are quick disconnects, allowing the easy installation and removal of the inside end-effector 108.

Control System Cart

The mini-riveter system 100 includes the control system cart 112, as shown in FIG. 15, which includes the vibratory bowl 286 for supplying fasteners, the control system 114 including a CPU 398 and display 400. The control system cart 112 also includes an electrical power supply 402 and an air/pneumatic source 404. The cart 112 is designed to transport the inside end-effector 108 and the outside end-effector 104 to a work area with minimal effort, and begin operations with a nominal compliment of operators. The cart 112, has the capabilities to perform all of the required operations for fastening the lap joint 116, including process checking/verification even before the mini-riveter system 100 is loaded onto the aircraft fuselage.

Operations

In the first embodiment, the mini-riveter system 100 is used to fasten two overlapping skin panels 110 forming a lap joint 116. Initially, each of the panels 110 is cleaned and the overlapping surface of the panels 110 are treated with a sealant. The panels 110 forming the lap joint 116 are then temporarily fastened with cleco fasteners in at least two points using coordination holes as means for alignment. The panels 110 may also be temporarily fastened to other panels to form part of a temporarily fastened fuselage assembly section.

Once a fuselage has been tacked together, an operator inserts index pins 120 into at least three coordination holes positioning the key portion 122 to protrude from the outside surface of the lap joint 116, and positioning the reflective head 126 to protrude from the inside surface of the lap joint 116. External rails 102 are then positioned and aligned to the index pins 120 with the three rail ties 134A–C. Once properly aligned, air pressure is applied via the tube portions 135A and 135B of the primary rail 130 and the secondary rail 132 to the vacuum generators 144A–F which generate a vacuum between the panels 110 and the rails, holding them in position. The outside end-effector 104 is then lifted onto the external guide rails 102 using the primary handle 200 and the secondary handle 202. The first and second clamshell bearing systems 204 and 206 are then closed by the activation of the primary and secondary air cylinders 212 and 214 locking the outside end-effector 104 into sliding engagement with the external guide rails 102.

The internal guide rails 106 are installed onto the inside surface of the panels 110 forming the lap joint 116 by positioning the upper and lower attachment brackets 308A–C and 310A–C adjacent to the frames within the fuselage and hooked behind the T-shaped portion of parallel stringers coupled to a respective one of the panels 110 forming the lap joint 116. The upper and lower attachment brackets 308A–C and 310A–C are then locked into place by tightening the levers 318A–F and 319A–F associated with each of the hooks 316A and 317A–F. This step roughly ensures that the internal guide rails 106 are properly aligned on the x' and y' axes on the inside surface of the lap joint 116.

Once the internal guide rails 106 have been properly installed and generally aligned, the inside end-effector subsystem 108 is slid onto the ends of the internal guide rails 106 and then properly homed to the first of the index pins 120 using its reflecting square 128. Then, the outside end-effector 104 is homed to the recess 125 of the key 122 of a first of the index pins 120, thereby independently aligning both the outside end-effector 104 and the inside end-effector 108.

The mini-riveter system 100 is directed to drill, countersink, and then rivet a plurality of columns within the lap joint 116, where each column consists of three rows of rivets. First, the outside end-effector 104 mini-riveter system 100 is driven from the home position or its last known position, to a distance along the x-axis upon which the selected column lies. Next, the pressure foot subassembly 230 is driven along the y-axis to the middle row to be fastened and then is pressed against the lap joint, applying pressure of between 100 and 500 lbs. The inside end-effector 108 is driven an identical distance along its x' axis to mirror the position of the outside end-effector 104. Then, one of the LH, RH or straight bucking bars 350, 352, or 371 is extended and rotated to an x' and y' position, such that it mirrors the position of the porthole clamp 237 of the outside end-effector 104. Further, the first gap portion 376 of the bucking bar is positioned along the z' axis to match the z-axis defining the machine axis along which the drill unit 262 will operate and a pressure of between 100 and 500 lbs. is exerted on the inside surface of the lap joint 116 by the bucking bar.

The external carriage 256 holding both the drill/countersink module 252 and the rivet/fastener feed module 254 is moved to align the drill bit and countersink 268 along the y axis. Next the drill module 256 is activated and moved along the z axis until a hole and countersink having the proper dimensions have been drilled within the lap joint 116. After the drill is retracted, the external carriage 256 moves the riveter/fastener feed module 254 along the y axis into position in alignment with the newly drilled hole. The fastener feed module 254 loads a selected rivet into the rivet feed fastener fingers 292A–D. Then, the inside end-effector 108 backs off the bucking bar while the fastener fingers 292A–D load the selected rivet into the newly drilled hole.

The driver of the rivet module 254 is then seated against the head of the rivet, and the bucking bar is moved towards the inside surface until it contacts the shank of the rivet. The rivet is held in place by the driver head of the pneumatic riveting unit 276. The rivet is then upset by a series of pneumatically induced pulses from the driver head of the riveting unit 276 until it is properly seated.

One of the rivet protrusion sensors 364A and 364B compares the length of the rivet shaft to the length of the desired rivet to ensure that the proper rivet was loaded before allowing the driving sequence, and then monitors the deformation of the shank to ensure that the riveting process ceases once a desired button has formed. The bucking bar and the pressure foot subassembly 230 are then released and moved to a new row. This process is repeated until each of the three rows within the column has been drilled, countersunk and properly riveted. Then, the inside and outside end-effector 104 and 108 respectively are moved along the x and x' axes respectively for positioning along a new column. This process is repeated until the entire lap joint 116 has been properly fastened.

The above-described process may be used for a plurality of mini-riveter systems used simultaneously on different bays of an aircraft fuselage. In this embodiment, one set of operators can operate two or more systems by setting up a second system while a first system is performing an operation on a lap joint. In this manner production flow rates can be greatly increased without increasing manpower requirements.

Figure 16:
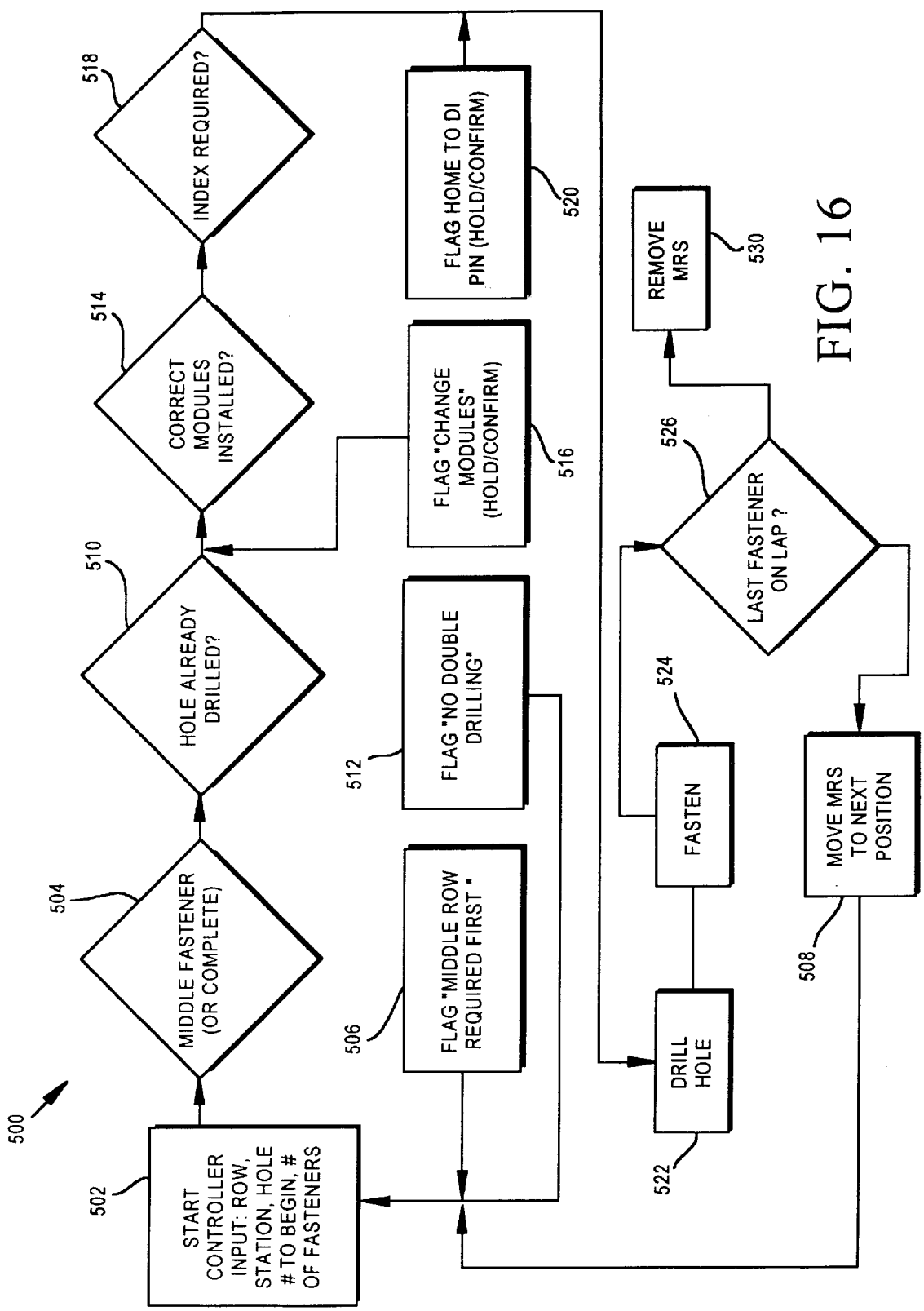
FIG. 16 is a flow chart showing a main operational routine implemented by a control processing unit (CPU) of the control system.
Figure 17:
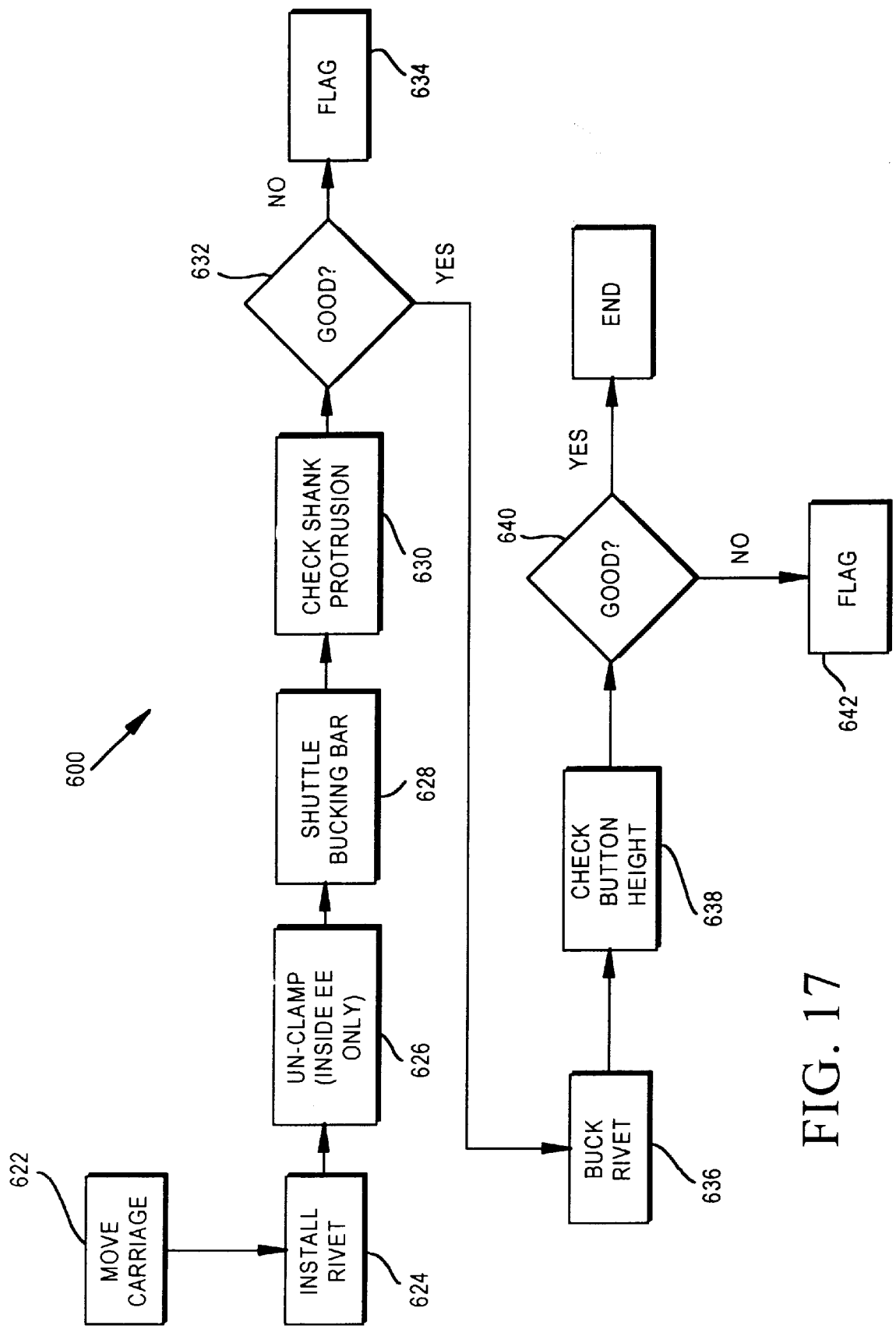
FIG. 17 is a flow chart showing a clamping and drilling subroutine invoked by the operational routine.

FIG. 16 shows a series of program instructions coordinated by the CPU 398 of the control system 114 to direct the mini-riveter system 100 during positioning, drilling, and fastening operations. Flow charts from which source code can be written by one skilled in the art are illustrated in FIGS. 16–18.

Referring to FIG. 16, a main routine 500, which is executed by the CPU 398 begins at step 502 by requesting an input of data, including the x and y, as well as the x' and y' position of a fastener on a particular row and column of the lap joint 116, as well as the position where the fastening process commences and the number of fasteners to be used. Next, in step 504, the CPU 398 determines whether the next position to be fastened is that of a middle row fastener. If not, then the CPU 398 proceeds to step 506 and sets a flag "middle row required first," and returns to step 502, where it instructs the mini-riveter system 100 to move to the next designated position. If the CPU 398 determines in step 504 that the selected rivet position is a middle fastener position, it then proceeds to step 510, where it checks if a hole has already been drilled in that position. If a hole has been drilled, then the CPU 398 proceeds to step 512, and sets a flag "no double drilling" and returns to step 502. However, if a hole had not already been drilled, the CPU 398 then proceeds to step 514 and checks whether the proper drilling/countersink module and rivet/fastener feed modules had been installed. If not, the CPU 398 proceeds to step 516 and begins a holding loop, as well as setting a flag "change modules." However, if the proper modules have been installed, then the CPU 398 proceeds to step 518 and checks whether the outside end-effector 104 needs to be homed. If yes, the CPU 398 proceeds to step 520 and instructs the outside end-effector 104 to home to the nearest of the index pin 220. If the homing step is not required, then the CPU 398 proceeds to step 522, which invokes the hole drilling subroutine 550.

Figure 18:
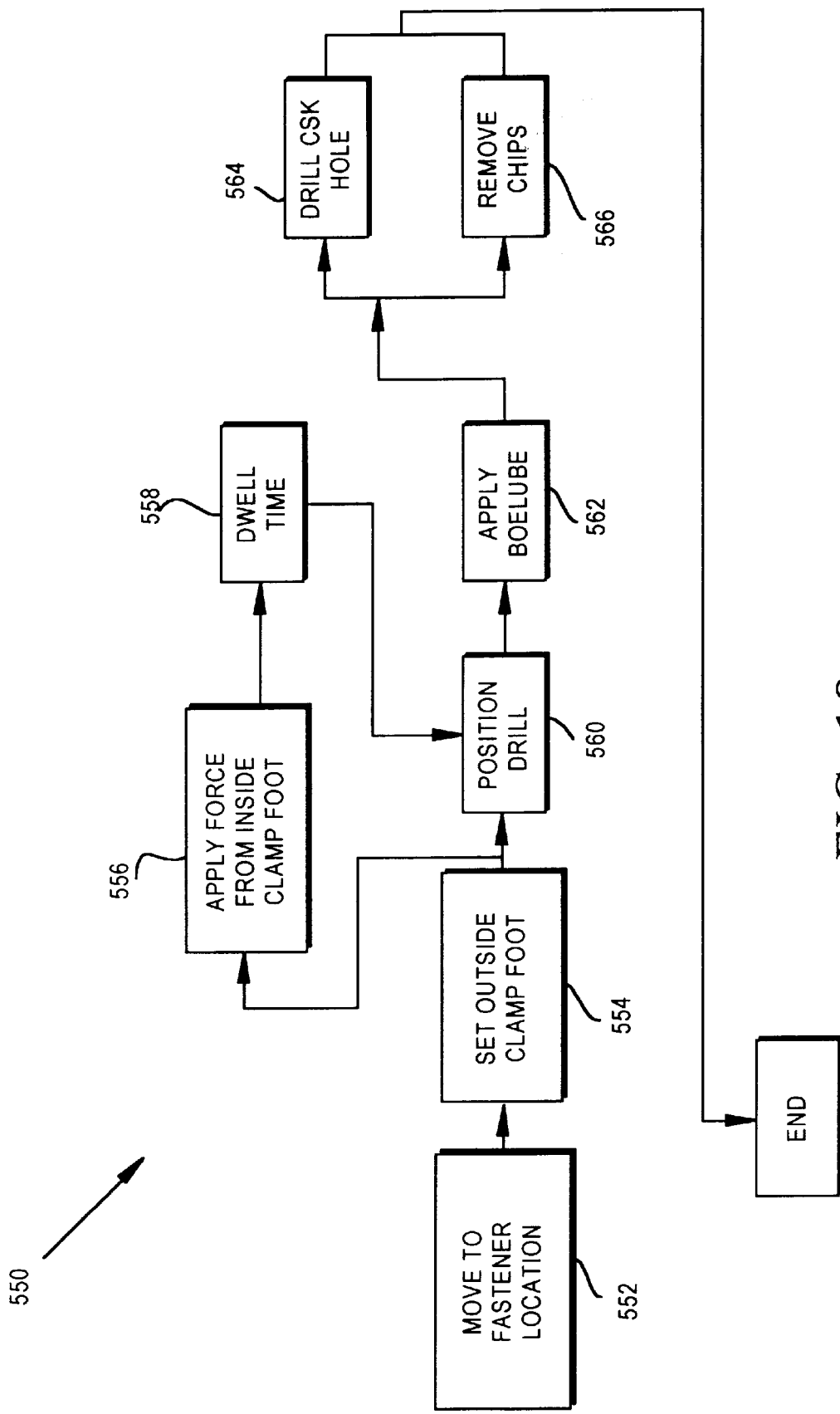
FIG. 18 is a flowchart showing a fastening subroutine invoked by the operational routine.

In the first step 552 of the hole drilling subroutine 550, shown in FIG. 18, the CPU 398 directs the outside and inside end-effectors 104 and 108 respectively to move along the x and x' axis, respectively, to the position to be drilled. Next, in step 554, the CPU 398 moves the porthole clamp 232 of the pressure foot assembly 230 along the y axis, while the bucking bar is moved and rotated to a mirror position on the y' axis. Next, in step 556, the CPU 398 directs the pressure foot assembly 230 to apply a force onto the lap joint 116 for a specified dwell time, which is selected in step 558. Then, the CPU 398 proceeds to step 560, where it moves external the module carriage 256 to position the drill/countersink module 268 to the desired position along the (x,y) axes of the lap joint 116. The CPU 398 then proceeds to step 562, where it directs the application of Boelube to the area to be drilled. After step 562, the CPU 398 proceeds to step 564, where it instructs the drilling/countersink module 268 to travel along the y axis to a specified point for properly drilling and countersinking the hole. Then, the CPU 398 proceeds to step 566 and optionally directs the application of air pressure to the area to remove any drill chips. Next, the CPU 398 proceeds to step 568, where it directs the inspection of the hole. The CPU 398 then proceeds to step 570, where it ends the subroutine 550, and returns to the main routine 500.

Once the hole drilling subroutine 550 has been completed, the CPU 398 proceeds to step 524 of the main routine 500 and invokes the fastening subroutine 600.

In the first step 602 of the fastening subroutine 600, shown in FIG. 17, the CPU 398 directs the external module carriage 256 to position the rivet driver/fastener feed module 254 to place it in alignment with the newly drilled hole. Next, the CPU 398 proceeds to step 624 and directs the fastener feed system to load a rivet into the assembly's finger units 292A–D. The CPU 398 then proceeds to step 626, where it directs the inside end-effector assembly 108 to un-clamp the bucking bar, which was applying pressure to the inside surface of the lap joint 116. In step 628, the CPU 398 backs off the bucking bar to a standby position, and the fastener feed fingers 292A–D install the rivet into the newly drilled hole. The CPU 398 then proceeds to step 630, where it directs the rivet head protrusion sensor to measure the length of the shaft protruding from the inside surface of the lap joint 116. From there, the CPU 398 proceeds to step 632, where it compares the measured length of the shank protrusion with a tabular range of values allowable for the selected rivet to ensure that the correct rivet was loaded into the hole. If the CPU 398 determines that an improper type of rivet was loaded into the hole or that the rivet has an abnormal shank, it then proceeds to step 634 and sets a flag and stop further work. However, if the rivet is determined to be of the proper type and size, then the CPU 398 proceeds to step 636 and directs the pneumatic riveter unit 276 to begin bucking the rivet. The CPU 398 then proceeds to step 638, where it continues to monitor and the protrusion sensor 364A and 364B to determine if the deformed shank has formed a proper button of a specified height. If the button is still too large, the CPU 398 may direct the riveting process to continue until the proper button height has been obtained. If the proper button height cannot be obtained after checking its height in step 640, the CPU 398 will proceed to step 642 and set a flag and stop the system 100. However, if the CPU 398 determines that the button height falls within proper tolerances, it ends the subroutine and proceeds back to step 524 of the main routine 500.

Once the fastening subroutine 600 has been completed, the CPU 398 of the control system 114 proceeds to step 526 of the main routine 500, where it checks to see whether another fastening operation is to occur or whether it is the last fastener on the lap joint 116. If the CPU 398 determines that the last fastener has not yet been installed, then it proceeds to step 528 and moves the mini-riveter system 100 to the next desired position and returns to step 502. However, if the CPU 398 determines that this was the last fastener operation to occur on the lap joint 116, then it proceeds to step 530 and displays an instruction on display 400 to remove the mini-riveter system from the bays being operated on.

The mini-riveter system 100 is easy to set up and use, and requires only a small amount of manpower and man hours to set up and operate. Further, the mini-riveter system 100 can fit into areas heretofore inaccessible by drilling and fastening machines, due to its ability to be supported and aligned by the components it is fastening and because of its small size. Preferably the entire mini-riveter system 100 does not exceed 200 lbs., where the end-effectors are designed to weigh less than 40 lbs. and the tracks even less. Further, the mini-riveter system is small in size and was designed not to exceed an envelope of 17" along the y and y' axes by 24" along the z and z' axes. This same design concept, where a small, light weight end-effector is supported and indexed relative to the parts being assembled can be used in many other areas of part assembly. Except as otherwise disclosed herein, the various components shown in outline or block form are individually well-known and their internal construction and operation is not critical, either to the making or the using of this invention.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

What is claimed is:

1. Vacuum fastened guide for supporting and facilitating movements of a machining device along at least one component to be operated upon, said guide comprising:
   a primary rail that is vacuum coupled to the component, said primary rail including;
      a primary tube portion for slideable engagement with the machining device,
      a primary contact platform coupled to said primary tube portion for forming a vacuum between said primary rail and the component;
   a secondary rail including:
      a secondary tube portion for slideable engagement with the machining device, and
      a secondary contact platform coupled to said secondary tube portion for forming a vacuum between said secondary rail and said component; and
   a plurality of rail ties, each of said rail ties having a primary end coupled to said primary rail and a secondary end coupled to said secondary rail, wherein said plurality of rail ties aligns said vacuum guide to the component, wherein said plurality of rail ties are aligned with a corresponding feature of the component, and wherein said feature of the component is a coordination hole drilled into the component.

2. Vacuum fastened guide for supporting and facilitating movements of a machining device alone at least one component to be operated upon, said guide comprising:
   a primary rail that is vacuum coupled to the component, said primary rail including;
      a primary tube portion for slideable engagement with the machining device,
      a primary contact platform coupled to said primary tube portion for forming a vacuum between said primary rail and the component,
   a secondary rail including:
      a secondary tube portion for slideable engagement with the machining device,
      a secondary contact platform coupled to said secondary tube portion for forming a vacuum between said secondary rail and said component, wherein said primary contact platform and said secondary contact platform each include:
         a plurality of gasketed vacuum pads positioned on a primary surface of said primary contact platform and a secondary surface of said secondary platform contacting the component; and
         a plurality of vacuum generators, each generating a vacuum within a respective one of said plurality of gasketed vacuum pads, wherein each of said plurality of vacuum generators includes:
            a vacuum pump for inducing a vacuum on a suction side of said pump from a supply of pressurized air, wherein said supply of pressurized air to said vacuum pump of each of said vacuum generators is supplied via said primary tube portion and said secondary tube portion;
            a vacuum gauge for indicating the vacuum produced by said vacuum pump; and
            a vacuum switch for indicating whether said vacuum pump is in operation.

3. Vacuum fastened guide for supporting and facilitating movements of a machining device along at least one component to be operated upon, said guide comprising:
   a primary rail that is vacuum coupled to the component, said primary rail including;
      a primary tube portion for slideable engagement with the machining device, and
      a primary contact platform coupled to said primary tube portion for forming a vacuum between said primary rail and the component,
   a secondary rail including:
      a secondary tube portion for slideable engagement with the machining device,
      a secondary contact platform coupled to said secondary tube portion for forming a vacuum between said secondary rail and said component, wherein said primary contact platform and said secondary contact platform each include:
         a plurality of gasketed vacuum pads positioned on a primary surface of said primary contact platform and a secondary surface of said secondary platform contacting the component; and
         a plurality of vacuum generators, each generating a vacuum within a respective one of said plurality of gasketed vacuum pads, wherein each of said plurality of vacuum generators includes:
            a vacuum pump for inducing a vacuum on a suction side of said pump from a supply of pressurized air;
            a vacuum gauge for indicating the vacuum produced by said vacuum pump; and
            a vacuum switch for indicating whether said vacuum pump is in operation; and
   a pneumatic logic circuit for indicating whether said primary rail and said secondary rail are held by a sufficient vacuum, wherein said circuit inputs an output from said vacuum switch of one of said vacuum generators into an "AND" logic circuit and outputs the result to an adjacent one of said vacuum generators, a resulting signal for each of said vacuum generators of said primary and secondary guide rails are input to a control system for displacing a vacuum lost or vacuum satisfactory display.

4. Vacuum fastened guide for supporting and facilitating movements of a machining device along at least one component to be operated upon, said guide comprising:

a primary rail that is vacuum coupled to the component, said primary rail including:
    a primary tube portion for slideable engagement with the machining device, said primary tube being hollow to allow the flow of air, and
    a primary contact platform coupled to said primary tube portion for forming a vacuum between said primary rail and the component, said vacuum created by the flow of air through said primary tube.

\* \* \* \* \*